(12) United States Patent
Lafortune et al.

(10) Patent No.: US 11,130,097 B2
(45) Date of Patent: Sep. 28, 2021

(54) SYSTEM AND METHOD FOR DESALINATION OF WATER BY REVERSE OSMOSIS

(71) Applicant: ONEKA TECHNOLOGIES, Sherbrooke (CA)

(72) Inventors: Renaud Lafortune, Sherbrooke (CA); Dragan Tutic, Sherbrooke (CA)

(73) Assignee: ONEKA TECHNOLOGIES, Sherbrooke (CA)

( * ) Notice: Subject to any disclaimer, the term of this patent is extended or adjusted under 35 U.S.C. 154(b) by 206 days.

(21) Appl. No.: 16/308,547

(22) PCT Filed: Jun. 9, 2017

(86) PCT No.: PCT/CA2017/050715
§ 371 (c)(1),
(2) Date: Dec. 10, 2018

(87) PCT Pub. No.: WO2017/210800
PCT Pub. Date: Dec. 14, 2017

(65) Prior Publication Data
US 2019/0151798 A1    May 23, 2019

Related U.S. Application Data

(60) Provisional application No. 62/348,431, filed on Jun. 10, 2016.

(51) Int. Cl.
*B01D 61/02*    (2006.01)
*C02F 1/44*    (2006.01)
(Continued)

(52) U.S. Cl.
CPC ......... *B01D 61/025* (2013.01); *B01D 61/04* (2013.01); *B01D 61/10* (2013.01); *C02F 1/441* (2013.01);
(Continued)

(58) Field of Classification Search
CPC ........ B01D 2311/04; B01D 2311/2649; B01D 2313/246; B01D 2313/36;
(Continued)

(56) References Cited

U.S. PATENT DOCUMENTS

| 4,326,840 A | 4/1982 | Hicks et al. |
| 4,335,576 A | 6/1982 | Hopfe |

(Continued)

FOREIGN PATENT DOCUMENTS

| AU | 2010201994 A1 | 12/2010 |
| CA | 2673321 A1 | 6/2008 |

(Continued)

OTHER PUBLICATIONS

International Search Report and Written Opinion with regard to PCT/CA2017/050715 dated Sep. 11, 2017.
(Continued)

*Primary Examiner* — Dirk R Bass
(74) *Attorney, Agent, or Firm* — BCF LLP

(57) ABSTRACT

A wave-actuated system for desalination of water by reverse osmosis (RO) having a wave energy converter (WEC) subsystem and a RO desalination subsystem is disclosed. The WEC subsystem has a float, a reaction member, and a hydraulic cylinder connected between the float and the reaction member and defining first and second variable volume chambers The RO desalination subsystem has a RO cell containing a RO membrane and a flow smoothing device (FSD). During a first stroke of the WEC subsystem: the float moves in a first direction; and seawater is supplied from the first variable volume chamber to the RO cell and to the FSD. During a second stroke of the WEC subsystem: the float moves in a second direction; seawater is supplied from a seawater intake to the first variable volume chamber; and seawater is supplied from the FSD to the RO cell.

21 Claims, 24 Drawing Sheets

(51) Int. Cl.
*F03B 13/20* (2006.01)
*B01D 61/04* (2006.01)
*B01D 61/10* (2006.01)
*C02F 103/08* (2006.01)

(52) U.S. Cl.
CPC .......... *F03B 13/20* (2013.01); *B01D 2311/04* (2013.01); *B01D 2313/246* (2013.01); *B01D 2313/36* (2013.01); *B01D 2313/365* (2013.01); *C02F 2103/08* (2013.01); *C02F 2201/005* (2013.01); *C02F 2201/009* (2013.01); *F05B 2220/62* (2013.01); *Y02A 20/131* (2018.01); *Y02A 20/144* (2018.01); *Y02A 20/212* (2018.01); *Y02E 10/30* (2013.01); *Y02W 10/37* (2015.05)

(58) Field of Classification Search
CPC ............ B01D 2313/365; B01D 61/025; B01D 61/04; B01D 61/06; B01D 61/10; C02F 1/441; C02F 2103/08; C02F 2201/005; C02F 2201/009; F03B 13/20; F05B 2220/62; Y02A 20/131; Y02A 20/144; Y02A 20/212; Y02E 10/30; Y02E 10/38; Y02W 10/37

See application file for complete search history.

(56) References Cited

U.S. PATENT DOCUMENTS

| | | |
|---|---|---|
| 4,421,461 A | 12/1983 | Hicks et al. |
| 4,512,886 A | 4/1985 | Hicks et al. |
| RE32,144 E | 5/1986 | Bowie |
| 5,186,822 A | 2/1993 | Tzong et al. |
| 5,628,198 A | 5/1997 | Permar |
| 6,083,382 A | 7/2000 | Bird |
| 7,023,104 B2 | 4/2006 | Kobashikawa et al. |
| 7,785,163 B2 | 8/2010 | Spencer et al. |
| 7,878,734 B2 | 2/2011 | Bull et al. |
| 8,291,701 B2 | 10/2012 | Papadopoulos |
| 8,562,833 B2 | 10/2013 | Marcum |
| 8,668,472 B2 | 3/2014 | Tillotson |
| 9,233,340 B1 | 1/2016 | Elish et al. |
| 9,334,860 B2 | 5/2016 | Knowles et al. |
| 2004/0007881 A1 | 1/2004 | Kobashikawa et al. |
| 2011/0006005 A1 | 1/2011 | Thomson et al. |
| 2011/0025072 A1 | 2/2011 | Ovadia |
| 2011/0030365 A1 | 2/2011 | Gilboa |
| 2011/0113771 A1 | 5/2011 | Foster et al. |
| 2011/0303608 A1 | 12/2011 | Huen |
| 2013/0052042 A1 | 2/2013 | Smith |
| 2014/0150872 A1 | 6/2014 | Marschke |
| 2014/0232116 A1 | 8/2014 | Thomson et al. |
| 2015/0298062 A1 | 10/2015 | Zhu |
| 2017/0145984 A1 | 5/2017 | Matthews et al. |

FOREIGN PATENT DOCUMENTS

| | | |
|---|---|---|
| CN | 103214063 A | 7/2013 |
| CN | 103603765 A | 2/2014 |
| CN | 103214063 B | 7/2014 |
| CN | 204569496 U | 8/2015 |
| ES | 2107384 A1 | 11/1997 |
| FR | 2725710 B1 | 1/1997 |
| GB | 2467907 A | 8/2010 |
| GR | 1006006 B | 7/2008 |
| KR | 20100102258 A | 9/2010 |
| WO | 2004007953 A1 | 1/2004 |
| WO | 2004043576 A1 | 5/2004 |
| WO | 2008015047 A1 | 2/2008 |
| WO | 2008074810 A2 | 6/2008 |
| WO | 2009055884 A1 | 5/2009 |
| WO | 2009083982 A2 | 7/2009 |
| WO | 2010124170 A2 | 10/2010 |
| WO | 2012131621 A2 | 10/2012 |
| WO | 2013003184 A2 | 1/2013 |
| WO | 2013049590 A1 | 4/2013 |
| WO | 2014100674 A1 | 6/2014 |
| WO | 2016044325 A1 | 3/2016 |
| WO | 2017/091483 A1 | 6/2017 |

OTHER PUBLICATIONS

Davies, "Wave-powered desalination: resource assessment and review of technology", Elsevier, Desalination 186 (2005), pp. 97-109.

Dashtpour et al., "Energy Efficient Reverse Osmosis Desalination Process", International Journal of Environmental Science and Development, vol. 3, No. 4, 2012, pp. 339-345.

English Abstract for KR20100102258 retrieved on Espacenet on Dec. 8, 2018.

English Abstract for FR2725710 retrieved on Espacenet on Dec. 8, 2018.

English Abstract for ES2107384 retrieved on Espacenet on Dec. 8, 2018.

English Abstract for GR1006006 retrieved on Espacenet on Dec. 8, 2018.

DOW Water & Process Solutions, "FILMTEC™ Reverse Osmosis Membranes", Technical Manual, 181 pages.

European Search Report with regard to EP17809513.9 dated Apr. 21, 2020.

English Abstract for CN103214063 retrieved on Espacenet dated Mar. 9, 2021.

Office Action and Search Report with regard to the counterpart CN Patent Application No. 201780042778.0 dated May 8, 2021.

English Abstract for CN 103214063 retrieved on Espacenet dated May 25, 2021.

English Abstract for CN204569496 retrieved on Espacenet dated May 25, 2021.

English Abstract for CN 103603765 retrieved on Espacenet dated May 25, 2021.

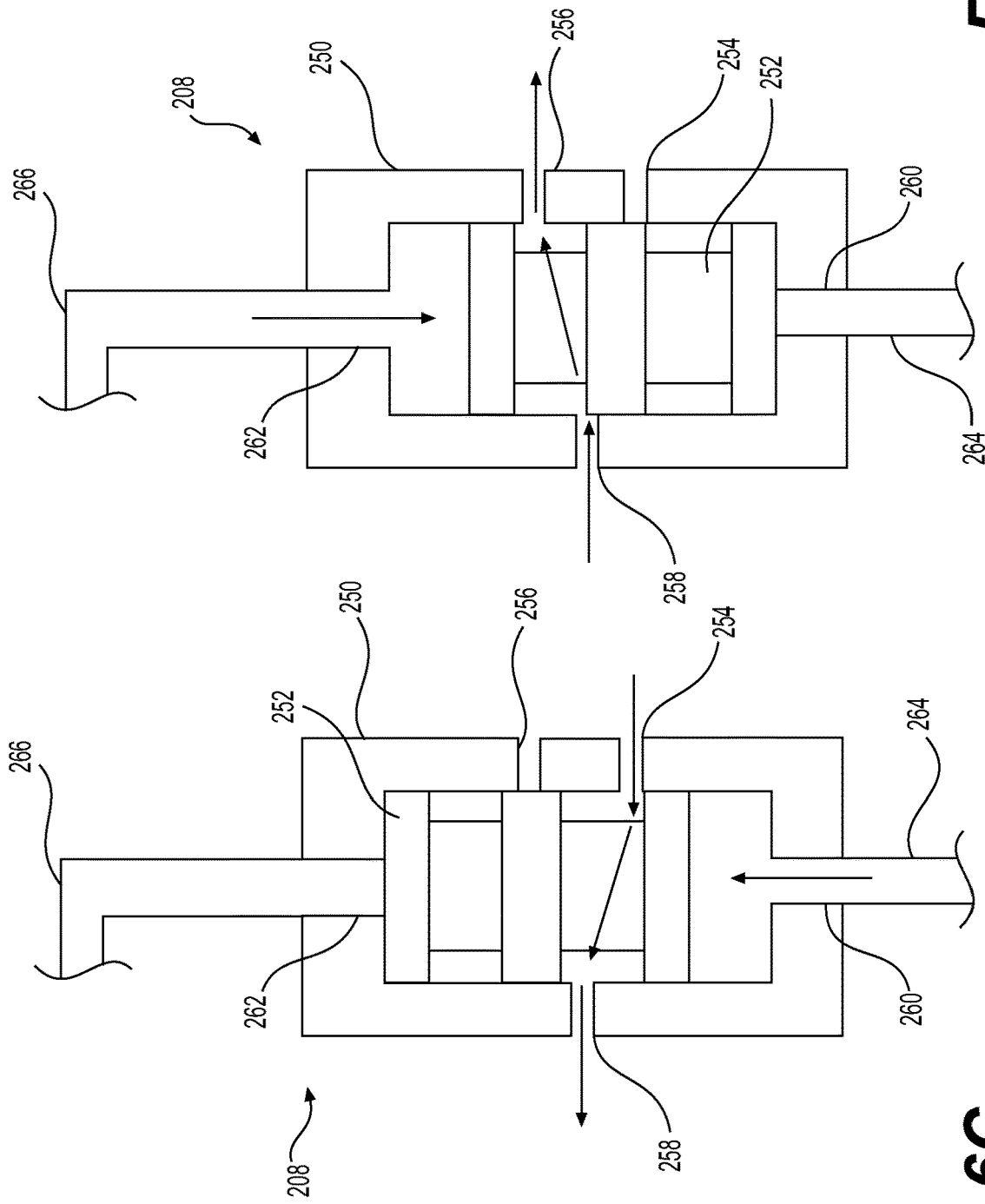

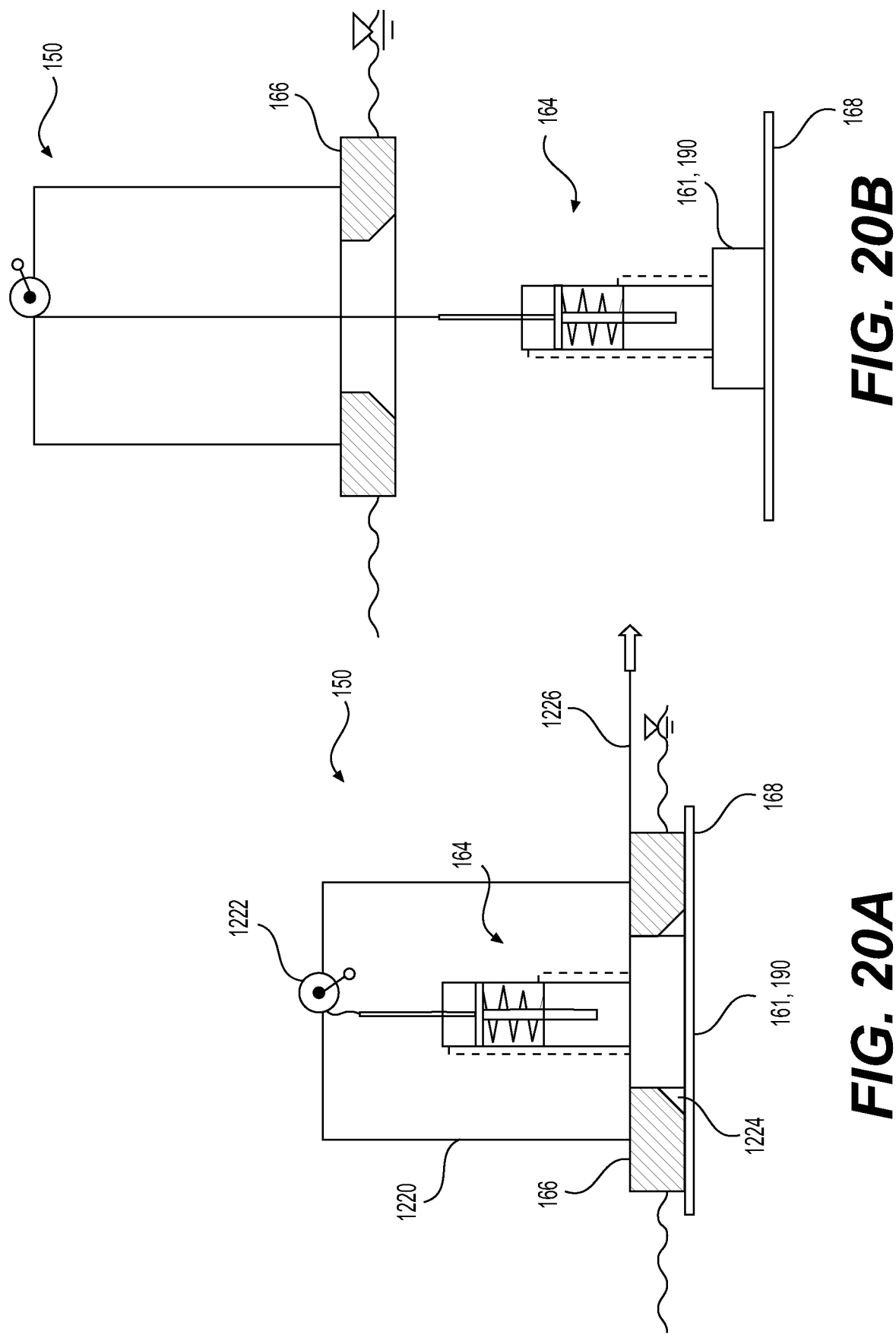

SYSTEM AND METHOD FOR DESALINATION OF WATER BY REVERSE OSMOSIS

CROSS-REFERENCE

The present application claims priority to U.S. Provisional Patent Application No. 62/348,431, filed Jun. 10, 2016, the entirety of which is incorporated herein by reference.

TECHNICAL FIELD

The present technology relates to systems and methods for desalination of water by reverse osmosis. More specifically, the present technology provides systems and methods using energy converted from sea waves for desalination of water by reverse osmosis.

BACKGROUND

Desalination of seawater can be achieved by many methods. Reverse osmosis (RO) has gained popularity since the 1970s and is now more common. The process works by pumping seawater at high pressure inside semi-permeate membranes. When the pressure is higher than the osmotic pressure of the fluid, desalted water is produced.

FIG. 1 schematically illustrates a RO system 10 that is commonly used by the desalination industry. As can be seen, seawater is pumped from the sea by a low pressure pump 12 though filters 14. The low pressure pump 12 is powered by an electric motor or an engine 16. From the filters 14, the filtered seawater is pumped by a high pressure pump 18 through an assembly of a flow smoothing device and valve 20. The high pressure pump 18 is powered by an electric motor or an engine 22. From the assembly 20, the filtered seawater then flows through RO membranes 24 that divide the input seawater into permeate (desalted water) and brine (concentrate with higher salt content than seawater). The permeate is stored until it needs to be used. From the RO membranes 24, the brine flows through the assembly 20 and then through an energy recovery device (ERD) 26. The ERD 26 assists in running the high pressure pump 18 using energy from the flow of brine. From the ERD 26, the brine is returned to the sea.

The flow inside the RO membranes 24 should be sufficient to prevent clogging that leads to low performance (low permeate production). The ratio of the permeate flow to the intake seawater is commonly held between 20 and 25% to prevent clogging and to use less chemical cleanings. The brine flow accounts for 75 to 80% of the intake seawater flow. The energy lost in the pressurized brine is consequently important because this energy corresponds to brine flow multiplied by pressure. There is a low pressure drop along the membranes so the energy loss from pressurized brine waste is more significant than the energy to desalinate the seawater.

The waste of energy of the pressurized brine flow has led to innovations called ERDs, such as the ERD 26 described above. This saves energy for the whole desalination process and reduces the cost in energy necessary to drive the RO pumps, such as the pumps 12 and 18 described above. FIG. 1 shows that the ERD 26 is hydraulically connected to the brine discharge from the RO membranes 24 to recover pressure from the brine. The ERD 26 is mechanically connected, by a transmission shaft for example, to the high pressure pump 18 to transmit power to the high pressure pump 18. As a result, the electric motor or engine 22 has to transmit less torque to the high pressure pump 18 than if the ERD 26 was not provided, and thus operates using less power. Other arrangements of ERDs in RO desalination systems are also known.

As can be seen in FIG. 1, all of the above components are provided on-shore, except for the seawater inlet and the brine discharge that have to be located off-shore. However, this arrangement of on-shore and off-shore components increases the cost of complexity of the system.

Although significant progress has been made to save energy, the cost of energy still generally represents more than half the cost of production of permeate from seawater in RO systems. This figure is even worse in small RO systems designed for small communities or resorts that often use diesel generators to provide electricity at a higher rate. Dependence on diesel is a hassle for many remote communities as they rely on external supplies and have no control on the price fluctuation of diesel.

Wind and solar energy are also used to desalinate seawater. However this accounts for only a small fraction of the total installed capacity. Like diesel-based RO systems, wind and solar power require many energy conversion steps. These conversions all increase the number of components in the desalination system, increase the amount of maintenance required, and increases the initial price of the system itself and its operation.

Another renewable source of energy is wave energy, which has a high energy density. Wave energy converters (WECs) are often used to produce electricity but are also to pressurize seawater to be used in RO desalination systems. The forces in the waves are high and seawater can be pumped directly with relatively small devices. Examples of wave actuated pumps that pressurize seawater to be used in water desalination systems are described in International Patent Publication No. WO 2013/003184 A2, published on Jan. 3, 2013, in the name of Atmocean Inc., and International Patent Publication No. WO 2009/055884 A1, published on May 7, 2009, in the name of Seahorse Wave Energy—Energia Das Ondas S/A. Systems that use wave energy to pump seawater through RO membranes are sometimes referred to as Reverse Osmosis Wave Energy Converters (RO WECs).

It would be advantageous to have a RO WEC that is designed to reduce the number of components. Some RO WECs with ERD integrated directly in the pump (or hydraulic cylinder) are known. For example, International Patent Publication No. WO 2014/100674 A1, published Jun. 26, 2014, in the name of Resolute Marine Energy Inc. discloses an integrated bidirectional hydraulic cylinder with ERD where a hydraulic cylinder integrates a unidirectional pump with ERD.

However, the cyclical nature of waves makes them intermittent, and this intermittence does not allow wave energy to be used directly with RO membranes. Many WECs work in a bidirectional way so that the power or water production is more constant. Other WECs are unidirectional so the pumping phase is limited to a maximum of half a wave period. This leads to intermittent pumping that is not suitable for straight-forward use of commercial RO system.

In order to protect the RO membranes from clogging and reduce maintenance, filtration of seawater before it enters the RO membranes is desirable. In order to reduce the maintenance frequency and increase the life of filters provided in a RO WEC, providing an automated backwash system for the filters would be desirable. However, most existing systems require an auxiliary pump that has to be powered. This increases the complexity and cost of the RO WEC, especially since having reliable electric components in a water environment is a challenge.

Self-reacting WECs have raised a lot of interest because they do not need big structures like piles, big gravity anchors or heavy-duty drilling in the sea bed. They only need anchors to keep the device always in the same general location. Also, the forces generated inside the self-reacting WEC to produce useful work are significant.

A WEC can be resonant with the wave or not. To make it resonant, a WEC generally needs either a large mass, large range of motion or active control. However, these three solutions add significant costs, complexity and/or mass on the device.

Also, WEC generally require lots of equipment to be installed and maintained over the years. Well-equipped boats and winches are generally required. This makes the logistics of installing a WEC complex and expensive. As such, if the system is to be used in a remote area, it is unlikely the users could benefit from using a RO WEC.

A relatively lightweight apparatus would make it easier to assemble, install and transport WEC. The anchors of the WEC are sometimes the heaviest parts of the whole system. Self-reacting WECs are light so they do not need an anchoring system to work so as to produce energy or water (RO-WEC).

SUMMARY

It is an object of the present technology to ameliorate at least some of the inconveniences present in the prior art.

The present technology includes a reverse osmosis subsystem that is mechanically connected to an energy converter actuated by sea waves. In some embodiments, the desalination system includes a pre-filtration subsystem that works in negative or positive pressure and could include a self-backwash system.

The present technology linearizes pressure and flow at the same time inside an RO membrane using a small number of components. This allows the integration of commercial RO membranes within the system such that the structural integrity and performance is preserved. Also, as the seawater feed flow is kept generally constant, a fewer number of RO membranes is needed for a given water production capacity since the pressure linearization prevents the flow limit of the RO membrane to be exceeded. Exceeding the flow limit of the RO membrane could lead to damage of the RO membrane which then require replacement. This leads to a lower permeate production cost.

The present technology provides a system for water desalination by reverse osmosis process by the use of a wave energy converter. The wave energy is converted into mechanical energy to pump water with a hydraulic cylinder. The pressurized water is pumped in an intermittent and cyclic way inside the hydraulic system that contains RO membranes. The hydraulic system flattens the flow and pressure of the intermittently pumped water to transfer it to the RO membranes. This replicates the normal operating conditions of the commercial RO membranes inside standard desalination plants.

Some of the embodiments of the RO WEC presented herein are unidirectional so that they pump only in one direction when the wave height rises. This is more intermittent than a bidirectional WEC since there is no pumping inside the RO desalination subsystem for half of the wave period. However, there are many advantages to use a unidirectional WEC point absorber since the mechanical couplers can work only in tension and do not need a big structure to hold compression forces, but only a wire or rope.

A system suitable for commercialization should be simple and easily operable. As such, embodiments of systems presented herein are non-resonant and have a small volume and weight compared to other systems. Embodiments of the unidirectional RO WEC presented herein are simple by having a small number of components, lightweight by having a structure in tension and light reaction member and can be easily installed and removed from the sea. By having a floating RO WEC, it can be towed at sea to easily install, retrieve and maintain it. Also, a floating RO WEC gives easy access to parts provided on the float for maintenance and diagnosis.

In some embodiments, a pumping unit actuated by the waves has a float and a reaction member or drag plate. The relative motion between the float and the drag plate creates pumping action inside the hydraulic system. The subsystem used for desalination is fixed on the structure of the RO WEC and the desalted water (permeate) is carried to shore with a pipeline. As the permeate exiting the RO membrane ha a pressure that is higher than atmospheric pressure, the pressure difference causes the permeate to be pumped automatically to shore.

In some embodiments, the hydraulic system includes a pre-filtration subsystem that uses only the wave energy to operate. A backwash system, also powered by waves, is provided to clean the pre-filters and reduces the frequency of maintenance.

The entire system, except for the portion of the pipeline that extends to shore, is installed offshore to have a wave frequency sufficient to power the WEC so that it recovers enough energy to feed the RO desalination subsystem. This enables a relatively cheap and good quality seawater feed and a suitable location for the brine discharge. Only the pipeline used to carry permeate to shore is needed in embodiments of the present RO WEC. As would be understood, this is advantageous over the systems such as the one described in FIG. 1 above that require two pipelines: one to bring seawater from the sea to the system and one to return the brine to sea. Also, the single pipeline for permeate of the present embodiments has a smaller diameter than either of the pipelines of the system of FIG. 1. For a recovery ratio of 20% (i.e. 20% of the seawater fed to the system is turned to permeate) where the present and prior art systems produce permeate at the same rate, the permeate pipeline of the present embodiments carries one fifth of the water carried by the seawater feed pipeline and a quarter of the water carried by the brine pipeline of the prior art system shown in FIG. 1, and can therefore be proportionately smaller. Also, in some embodiments, the pressure of permeate flowing in the pipeline is much lower than in systems such as the ones described above (100 psi versus 2000 to 3000 psi). This lower pressure allows the use of a less expensive type of pipeline.

According to one aspect of the present technology, there is provided a wave-actuated system for desalination of water by reverse osmosis (RO) having a wave energy converter (WEC) subsystem and a RO desalination subsystem. The WEC subsystem has a float, a reaction member, and a hydraulic cylinder. The hydraulic cylinder has a cylinder body, and a piston slidably received in the cylinder body. One of the cylinder body and the piston is connected to the float. Another one of the cylinder body and the piston is connected to the reaction member. The piston and the cylinder body define a first variable volume chamber on a first side of the piston and a second variable volume chamber on a second side of the piston. The second side being opposite the first side. The first variable volume chamber is selectively hydraulically connected to a seawater intake. The RO desalination subsystem has a RO cell having a seawater inlet port, a brine exhaust port and a permeate exhaust port. The seawater inlet port is selectively hydraulically connected to the first variable volume chamber. The brine exhaust port is hydraulically connected to a brine discharge. The permeate exhaust port is hydraulically connected to a permeate discharge. A RO membrane is disposed in the RO cell. The RO cell also has a flow smoothing device (FSD) selectively hydraulically connected to the first variable volume chamber and hydraulically connected to the seawater inlet port. During a first stroke of the WEC subsystem: the float moves in a first direction; the one of the cylinder body and the piston being connected to the float moves in the first direction relative to the other of the cylinder body and the piston; seawater is supplied from the first variable volume chamber to the RO cell via the seawater inlet port; and seawater is supplied from the first variable volume chamber to the FSD. During a second stroke of the WEC subsystem: the float moves in a second direction opposite the first direction; the one of the cylinder body and the piston being connected to the float moves in the second direction relative to the other of the cylinder body and the piston; seawater is supplied from the seawater intake to the first variable volume chamber; and seawater is supplied from the FSD to the RO cell via the seawater inlet port.

In some embodiments of the present technology, the wave-actuated system also has at least one valve. The at least one valve selectively hydraulically connects the brine exhaust port with the second variable volume chamber. The at least one valve selectively hydraulically connects the second variable volume chamber with the brine discharge. During the first stroke, the at least one valve hydraulically connects the brine exhaust port with the second variable volume chamber to supply brine from the brine exhaust port to the second variable volume chamber. During the second stroke, the at least one valve hydraulically connects the second variable volume chamber with the brine discharge to supply brine from the second variable volume chamber to the brine discharge.

In some embodiments of the present technology, the at least one valve is a three-way valve having a first flow port hydraulically connected to the brine exhaust port, a second flow port hydraulically connected to the brine discharge, and a third flow port hydraulically connected to the second variable volume chamber.

In some embodiments of the present technology, the hydraulic cylinder also has: a first rod connected to the piston, the first rod being connected to the one of the float and the reaction member that is connected to the piston, the first rod extending in the first variable volume chamber; and a second rod connected to the piston and extending in the second variable volume chamber, the second rod having a larger diameter than the first rod.

In some embodiments of the present technology, the hydraulic cylinder also has a spring disposed in one of the first and second variable volume chambers.

In some embodiments of the present technology, the float is a first float. The WEC subsystem also has a second float connected to the one of the cylinder body and the piston being connected to the reaction member.

In some embodiments of the present technology, the reaction member is a drag plate.

In some embodiments of the present technology, the reaction member is a deadweight assembly.

In some embodiments of the present technology, the RO desalination subsystem also has a pressure smoothing device (PSD) hydraulically connected between the brine exhaust port and the brine discharge. The PSD accumulates brine during the first stroke and releases brine during the second stroke.

In some embodiments of the present technology, the PSD is an accumulator.

In some embodiments of the present technology, the hydraulic cylinder is a first hydraulic cylinder, the cylinder body is a first cylinder body, and the piston is a first piston. The FSD has: a second hydraulic cylinder having a second cylinder body and a second piston slidably received in the second cylinder body, the second piston and the second cylinder body defining a third variable volume chamber on a first side of the second piston and a fourth variable volume chamber on a second side of the second piston, the second side being opposite the first side, the third variable volume chamber being selectively hydraulically connected to the first variable volume chamber and hydraulically connected to the seawater inlet port, and the fourth variable volume chamber being hydraulically connected to the brine exhaust port. During the first stroke, seawater is supplied from the first variable volume chamber to the third variable volume chamber. During the second stroke, seawater is supplied from the third variable volume chamber to the RO cell via the seawater inlet port.

In some embodiments of the present technology, the RO desalination subsystem also has a pressure smoothing device (PSD) hydraulically connected between the brine exhaust port and the fourth variable volume chamber. The PSD accumulates brine during the first stroke and supplies brine to the fourth chamber during the second stroke.

In some embodiments of the present technology, the wave-actuated system also has a pre-filter subsystem. The pre-filter subsystem has at least one pre-filter hydraulically connected between the seawater intake and the first variable volume chamber.

In some embodiments of the present technology, a one-way valve is hydraulically connected between the seawater intake and the first variable volume chamber. The one-way valve prevents flow of seawater from the seawater intake to the first variable chamber via the at least one pre-filter during the first stroke. The one-way valve permits flow of seawater from the seawater intake to the first variable chamber via the at least one pre-filter during the second stroke.

In some embodiments of the present technology, the hydraulic cylinder is a first hydraulic cylinder, the cylinder body is a first cylinder body, and the piston is a first piston. The pre-filter subsystem also has: a second hydraulic cylinder having a second cylinder body and a second piston slidably received in the second cylinder body, one of the second cylinder body and the second piston being connected to the float, another one of the second cylinder body and the second piston being connected to the reaction member, the second piston and the second cylinder body defining a third variable volume chamber, the third variable volume chamber being selectively hydraulically connected to seawater inlet, and the third variable volume chamber being hydraulically connected to the at least one pre-filter to supply seawater to the at least one pre-filter during one of the first and second strokes.

In some embodiments of the present technology, the pre-filter subsystem also has a valve selectively hydraulically communicating the at least one pre-filter with one of the second variable volume chamber, the permeate exhaust port and an accumulator. When the valve opens, water flows from the one of the second variable volume chamber, the permeate exhaust port and the accumulator through the at least one pre-filter to backwash the at least one pre-filter.

In some embodiments of the present technology, the pre-filter subsystem also has an accumulator hydraulically connected between the at least one pre-filter and the first variable volume chamber.

In some embodiments of the present technology, an accumulator is selectively hydraulically connected to the first variable volume chamber. The accumulator supplies water to the first variable volume chamber during the second stroke.

In some embodiments of the present technology, the cylinder body of the hydraulic cylinder of the WEC subsystem is connected to the float, the piston of the hydraulic cylinder of the WEC subsystem is connected to the reaction member, the first variable volume chamber is a lower chamber, the second variable volume chamber is an upper chamber, the first stroke is an upward stroke, the first direction is an upward direction, the second stroke is a downward stroke; and the second direction is a downward direction.

According to another aspect of the present technology, there is provided a method for desalinating water by reverse osmosis using a wave-actuated system. The wave actuated system has a wave energy converter (WEC) subsystem and a reverse osmosis (RO) subsystem. The method comprises: during a first stroke of the WEC subsystem: supplying seawater from a first variable volume chamber of a hydraulic cylinder of the WEC subsystem to an RO cell of the RO subsystem via a seawater inlet port of the RO cell, the RO cell having a RO membrane contained therein, supplying seawater from the first variable volume chamber to a flow smoothing device (FSD) of the RO subsystem, supplying brine from a brine exhaust port of the RO cell, and supplying permeate from a permeate exhaust port of the RO cell; and during a second stroke of the WEC subsystem: supplying seawater from a seawater intake to the first variable volume chamber, supplying seawater from the FSD to the RO cell via the seawater inlet port, supplying brine from the brine exhaust port, and supplying permeate from the permeate exhaust port.

In some embodiments of the present technology, during the first stroke, supplying brine from the brine exhaust port comprises supplying brine from the brine exhaust port to a second variable volume chamber of the hydraulic cylinder. The method further comprises supplying brine from the second variable volume chamber to a brine discharge during the second stroke.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where:

FIG. 6C illustrates a configuration of a three-way valve of the RO desalination subsystem of the wave-actuated system of FIG. 6A during the upward stroke illustrated in FIG. 6A;

FIG. 6D illustrates a configuration of the three-way valve of FIG. 6C during the downward stroke illustrated in FIG. 6B;

FIGS. 20A and 20B illustrate two steps of one possible method of installing and removing the arrangement of the wave-actuated system of FIG. 19C.

DETAILED DESCRIPTION

Figure 1:
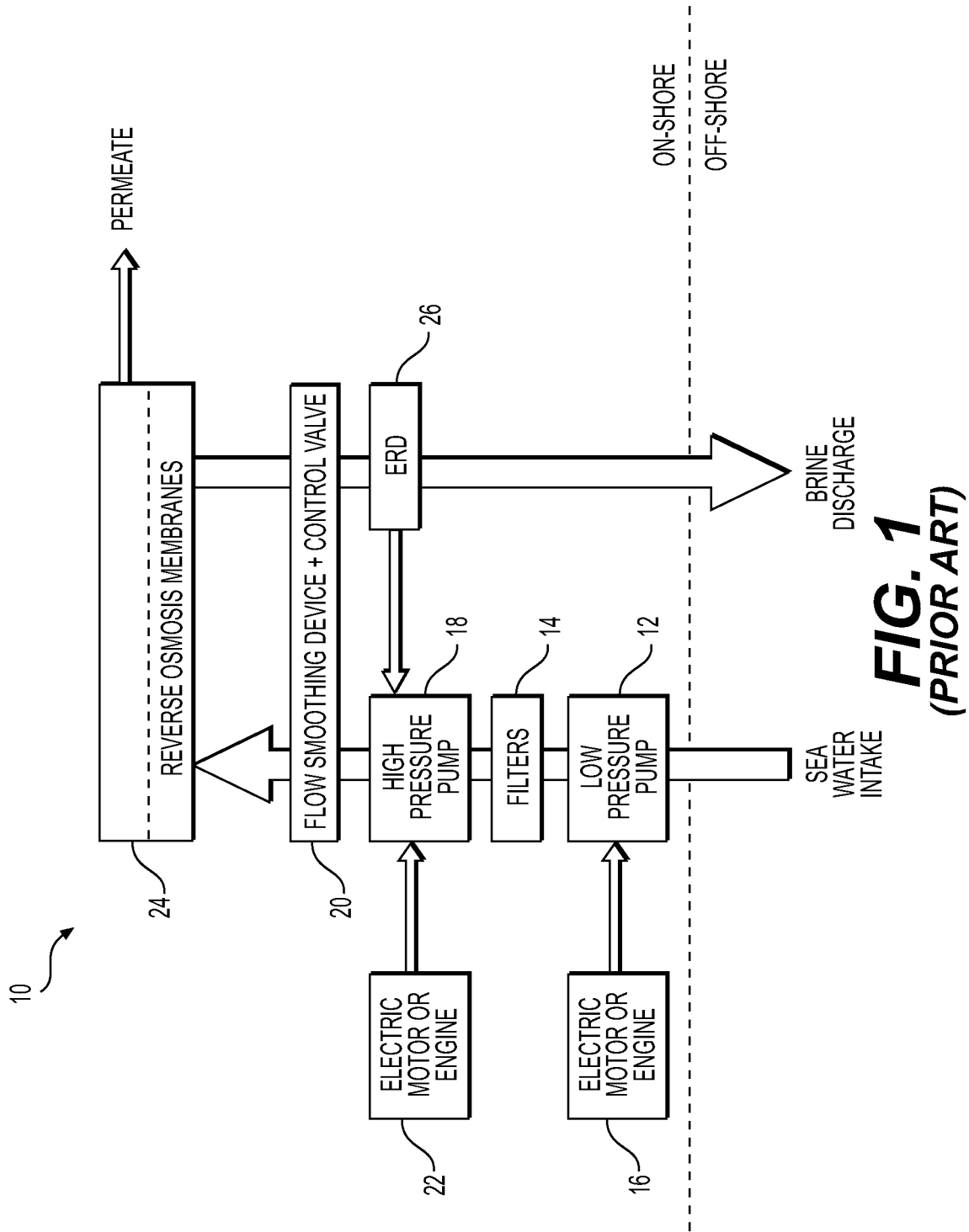
FIG. 1 is a schematic illustration of a prior art reverse osmosis water desalination system.
Figure 2:
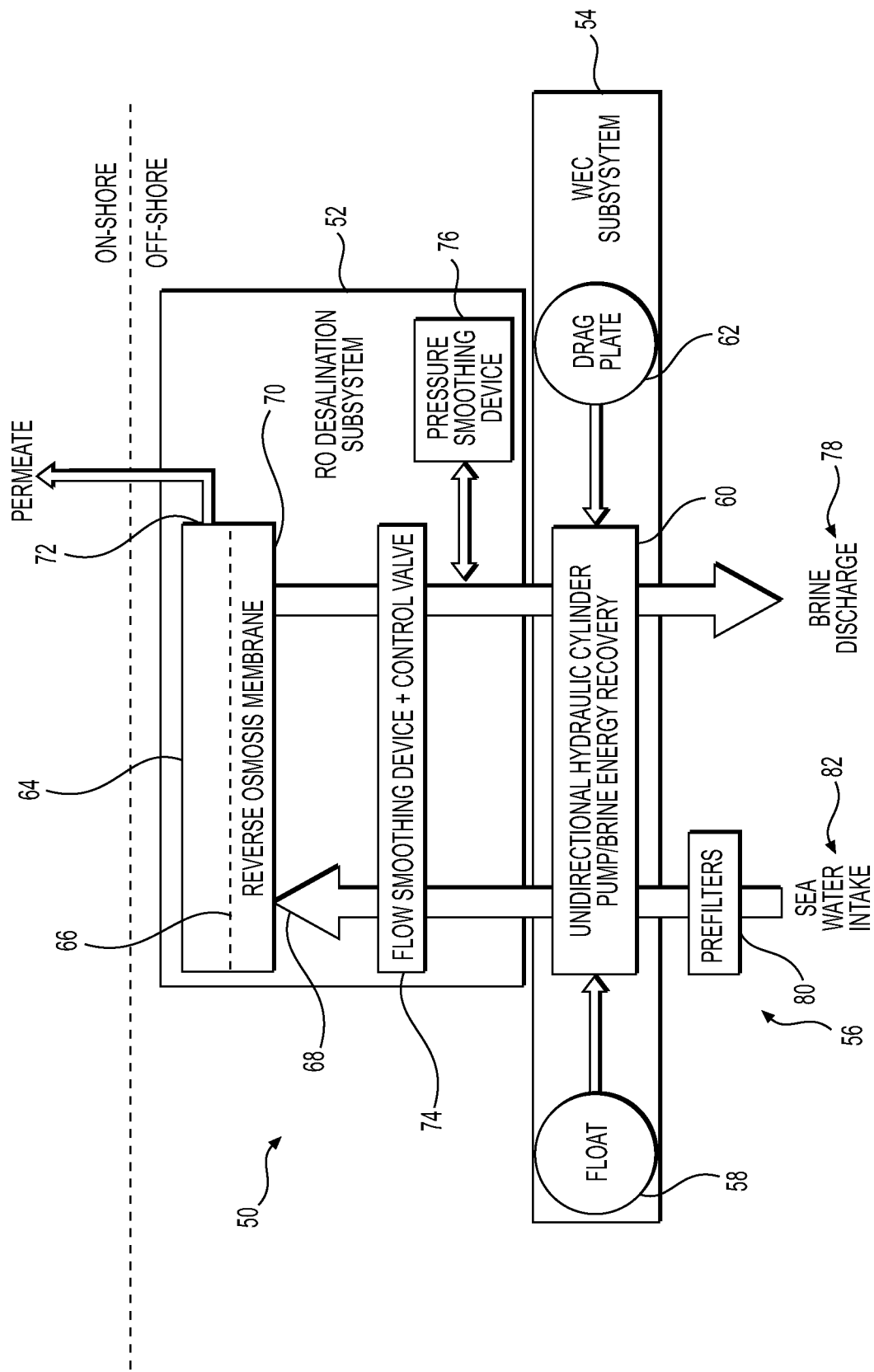
FIG. 2 is a schematic illustration of wave-actuated system for desalination of water by reverse osmosis.

With reference to FIG. 2, a wave-actuated system 50 converts and uses wave energy for desalinating water by reverse osmosis. As can be seen, the system 50 is divided in three subsystems: the reverse osmosis (RO) desalination subsystem 52, the wave energy converter (WEC) subsystem 54, and the pre-filter subsystem 56. Various embodiments of each of these subsystems will be described in more detail below.

In the system 50, wave energy is converted during one phase of the wave period (e.g. heaving upwards for a point absorber).

The WEC subsystem 54 has a float 58 that is connected to a unidirectional hydraulic cylinder 60 to transmit wave force to the hydraulic cylinder 60. The hydraulic cylinder 60 is also attached to a reaction member, which in the present embodiment is a drag plate 62. The drag plate 62 resists motion, while the float 58 rides the waves up and down. The relative motion between the float 58 and drag plate 62 generates high pressure pumping of seawater inside the unidirectional hydraulic cylinder 60, as will be described in more detail below. In the present embodiment, wave energy is converted during one phase of the wave period. From the hydraulic cylinder 60, the pressurized seawater then flows to the RO desalination subsystem 52. It is contemplated that more than one hydraulic cylinder 60 could be provided.

The RO desalination subsystem 52 produces fresh water, referred to herein a permeate. The RO desalination subsystem 52 has a RO cell 64 containing a RO membrane 66. It is contemplated that multiple RO cells 64 could be used and that each RO cell 64 could contain more than one RO membrane 66. The RO cell 64 has three ports: a seawater intake port 68, a brine exhaust port 70 and a permeate exhaust port 72. Seawater from the hydraulic cylinder 60 enters the RO cell 64 by the seawater intake port 68. The seawater is separated into permeate and brine inside the RO cell 64 by the RO membrane 66. The permeate exits the RO cell 64 by the permeate exhaust port 72 and flows to shore inside a pipeline (not shown) where it is used or stored. The brine exits the RO cell 64 by the brine exhaust port 72.

The seawater intake flow rate through the seawater intake port 68 is equal to the brine exhaust flow rate through the brine exhaust port 70 plus the permeate exhaust flow rate through the permeate exhaust port 72. In some embodiments, the permeate exhaust flow rate through the permeate exhaust port 72 is set to approximatively 20% of the seawater intake flow rate through the seawater intake port 68.

An assembly of a flow smoothing device and valve 74 is hydraulically connected to the seawater intake port 68 and the brine exhaust port 70 of the RO cell 64. A pressure smoothing device (PSD) 76 is hydraulically connected to the assembly 74 between the assembly 74 and the hydraulic cylinder 60. The hydraulic cylinder 60 supplies seawater to the RO cell 64 during one phase of the wave period. The assembly 74 and the PSD 76 work together to accumulate seawater during the this phase of the wave period and then cause the accumulated seawater to flow to enter the RO cell 64 by the seawater intake port 68 during the other phase of the wave period (i.e. when the hydraulic cylinder 60 is not supplying seawater to the RO cell 64). As a result, the flow of seawater to the seawater intake port 68 of the RO cell 64 is regulated to a more constant flow rate and pressure then if seawater was supplied to the seawater intake port 68 of the RO cell 64 only during the phase of the wave period where the hydraulic cylinder 60 supplies seawater. This imitates the operation of the RO membrane 66 where intake flowrate and intake pressure are constant, such as when supplied by a high-pressure pump such as pump 18 described above, and therefore allows the integration of commercially available RO membranes. Embodiments of the assembly 74 and the PSD 76 will be described in more detail below.

From the RO desalination subsystem 52, high pressure brine enters a second chamber of the unidirectional hydraulic cylinder 60. The pressure applied by the high pressure brine inside the hydraulic cylinder 60 produces work that is useful to lower the force needed from the WEC subsystem 54 and consequently lowers the energy requirement of the system 50. From the second chamber, the brine is discharged to the sea via a brine discharge 78. This will be described in more detail below.

The pre-filter subsystems 56 prevent big and small particles from entering the hydraulic components of the WEC subsystem 54 and RO desalination subsystem 52. Multiple pre-filters 80 are arranged in series downstream of the seawater intake 82. Other arrangements of the pre-filters 80 are contemplated. It is also contemplated that a single pre-filter 80 could be used. As shown in FIG. 2, the pre-filters 80 are connected to the unidirectional hydraulic cylinder 60. The hydraulic cylinder 60 sucks seawater from the seawater intake 82 through the pre-filters 80 during one phase of the wave period. In the present embodiment and the embodiments described below, where the pre-filters 80 are provided underwater, the total pressure drop across the pre-filters 80 is less than the sum of the atmospheric pressure and the water column hydrostatic pressure. For example, in an embodiment where the pre-filters and the first chamber of the hydraulic cylinder 60 receiving the seawater from the pre-filters are provided at a depth of ten meters, a pressure drop across the pre-filters 80 of 1 bar (i.e. the hydrostatic pressure) is possible. In such an embodiment, the pressure drop across the pre-filters 80 can twice the value where pre-filters 80 are provided above the sea surface. It is contemplated that the pre-filter subsystem 56 could be omitted.

Figure 3:
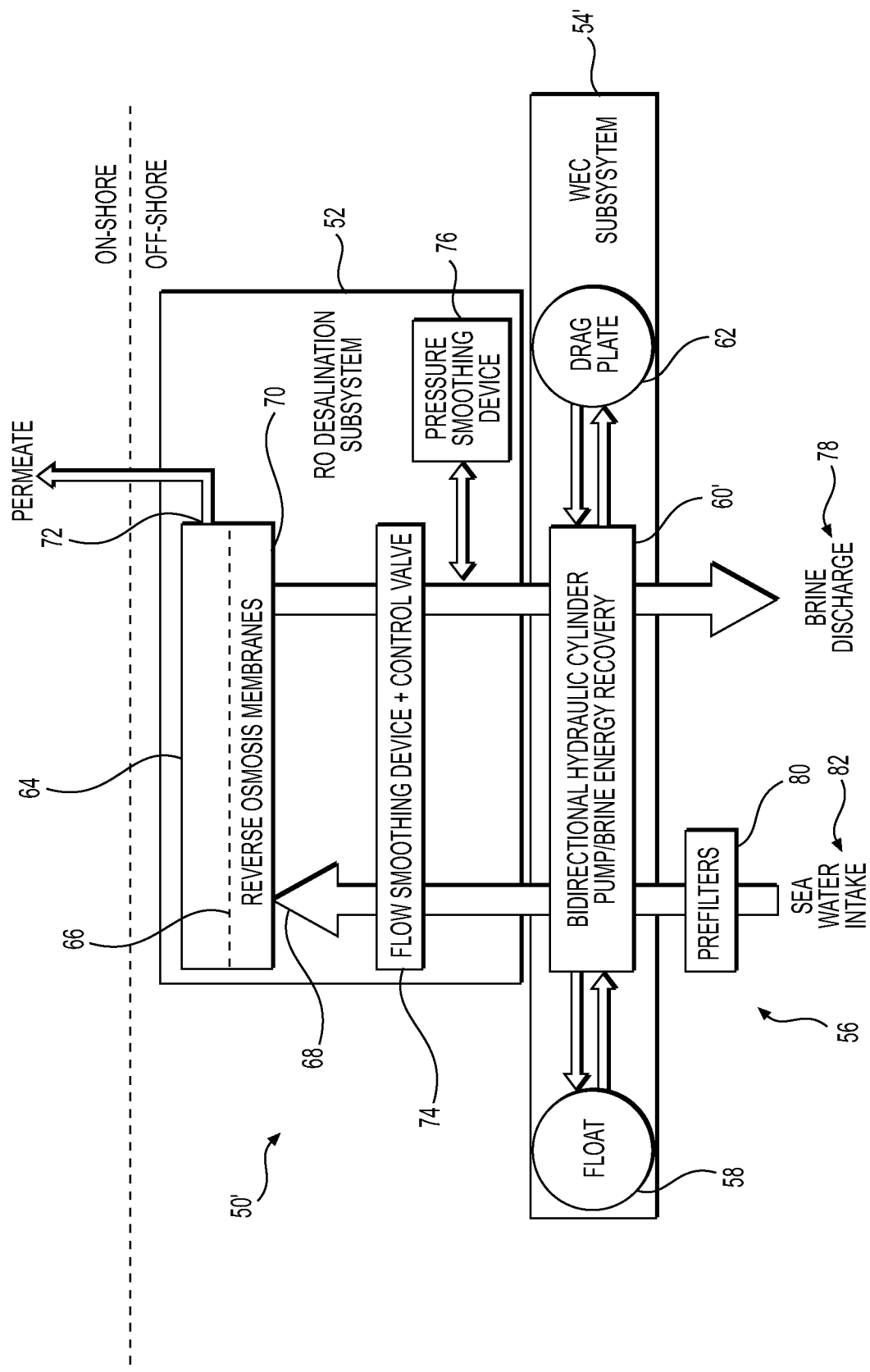
FIG. 3 is a schematic illustration of an alternative embodiment of a wave-actuated system for desalination of water by reverse osmosis.

FIG. 3 illustrates a wave-actuated system 50' which is an alternative embodiment of the system 50 described above. For simplicity, components of the system 50' that are similar to those of the system 50 described above have been labelled with the same reference numerals and will not be described again. The system 50' has the RO desalination subsystem 52 and the pre-filter subsystem 54 of the system 50, but the WEC subsystem 54 of the system 50 has been replaced by a WEC subsystem 54'. The WEC subsystem 54' has the float 58 and the drag plate 62 like those of the WEC subsystem 54, but the unidirectional hydraulic cylinder 60 has been replaced by a bidirectional hydraulic cylinder 60'. As a result, the wave energy is converted during two sequential phases of the wave period. It is contemplated that more than one bidirectional hydraulic cylinder 60' could be provided.

Figure 4:
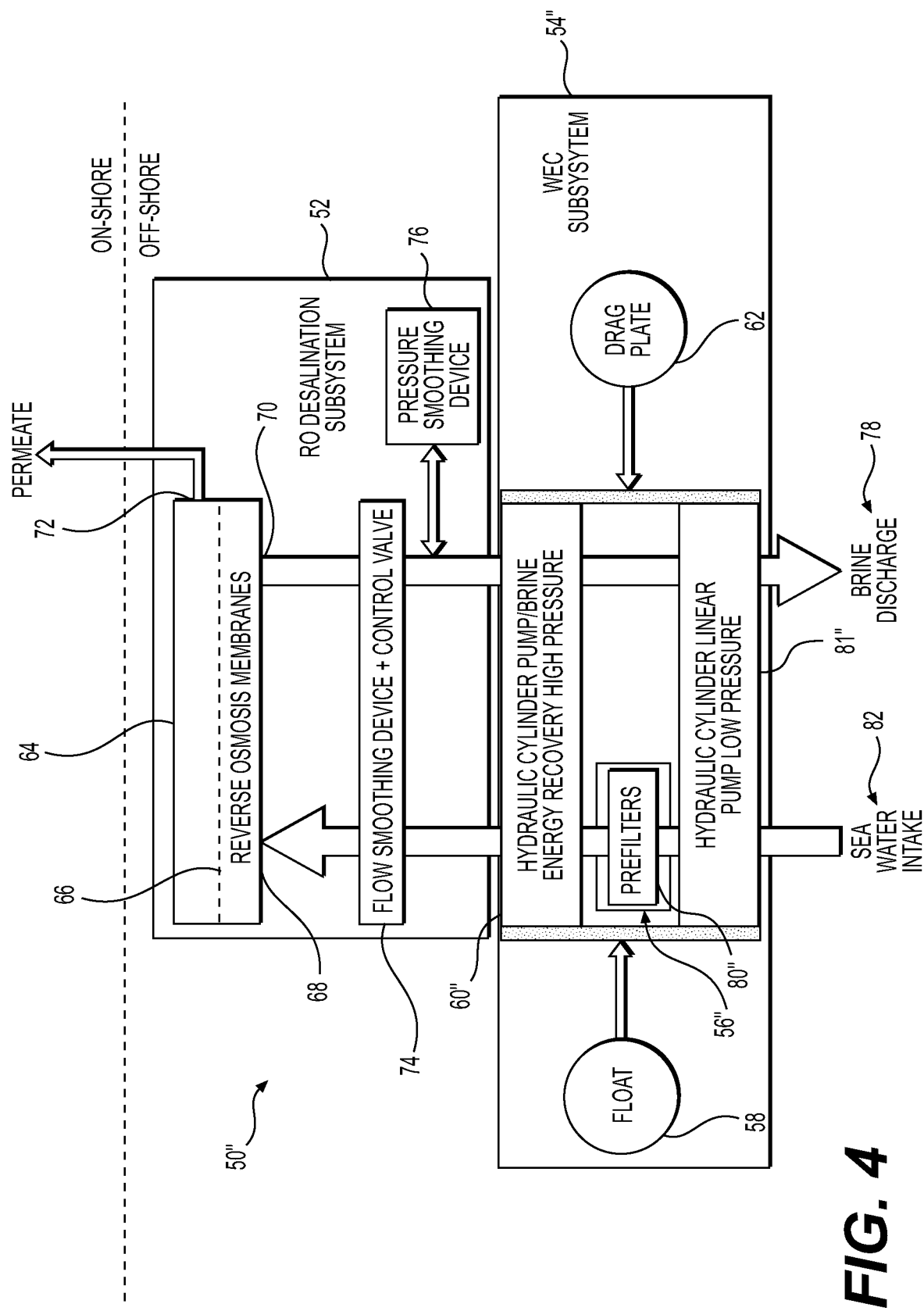
FIG. 4 is a schematic illustration of an alternative embodiment of a wave-actuated system for desalination of water by reverse osmosis.

FIG. 4 illustrates a wave-actuated system 50" which is an alternative embodiment of the system 50 described above. For simplicity, components of the system 50" that are similar to those of the system 50 described above have been labelled with the same reference numerals and will not be described again. The system 50" has the RO desalination subsystem 52 of the system 50, but the WEC subsystem 54 and the pre-filter subsystem 56 of the system 50 has been replaced by a WEC subsystem 54" and a pre-filter subsystem 56". The WEC subsystem 54" has the float 58 and the drag plate 62 like those of the WEC subsystem 54, and a hydraulic cylinder 60". In one embodiment, the hydraulic cylinder 60" is a unidirectional hydraulic cylinder like the cylinder 60 of the system 50. In another embodiment, the hydraulic cylinder 60" is a bidirectional hydraulic cylinder like the cylinder 60' of the system 50'. The WEC subsystem 54" also includes the pre-filter subsystem 56". The pre-filter 56" includes positive pressure pre-filters 80" and hydraulic cylinder linear pump 81". The pre-filters 80" are hydraulically connected upstream of the hydraulic cylinder 60". The hydraulic cylinder linear pump 81" is hydraulically connected between the pre-filters 80" and the seawater intake 82. Like the hydraulic cylinder 60", the hydraulic cylinder linear pump 81" is connected between the float 58 and the drag plate 62. The hydraulic cylinder 60" and the hydraulic linear pump 81" move together. The relative motion between the float 58 and drag plate 62 generates low pressure pumping of seawater inside the hydraulic cylinder linear pump 60". Seawater pumped by the hydraulic cylinder linear pump 60" is supplied to the pre-filters 80", and once filtered, to the hydraulic cylinder 60". The water pressure inside the hydraulic cylinder linear pump 60" is lower than the water pressure inside the RO desalination subsystem 52, but is higher than the pressure in the positive pressure pre-filters 80". The use of positive pressure pre-filters 80" allows a higher pressure drop across the pre-filters 80" compared to negative pressure (vacuum) pre-filters. This allows a broader range of commercially available pre-filters to be use in the pre-filter subsystem 56".

Figures 5A, 5B:
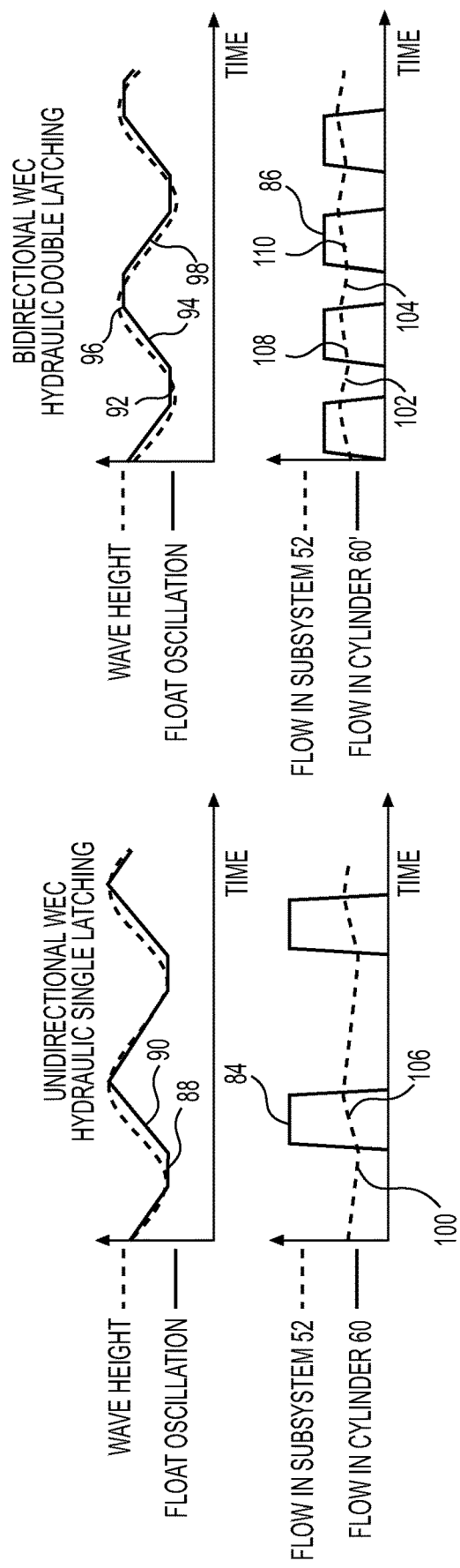
FIG. 5A illustrates the float oscillation, the flow through the RO desalination subsystem and the flow through the hydraulic cylinder of the system of FIG. 2 compared to wave height.
FIG. 5B illustrates the float oscillation, the flow through the RO desalination subsystem and the flow through the hydraulic cylinder of the system of FIG. 3 compared to wave height.

FIGS. 5A and 5B provide a comparison of the intermittent pumping flow rate of the unidirectional hydraulic cylinder 60 of the system 50 of FIG. 2 and of the bidirectional hydraulic cylinder 60' of the system 50' of FIG. 3 respectively. For comparison purposes, the average flow rate has been made equal in both embodiments. As such, as can be seen by comparing FIGS. 5A and 5B, the maximum instantaneous flow rate 84 of the unidirectional hydraulic cylinder 60 is about twice the maximum instantaneous flow rate 86 of the bidirectional hydraulic cylinder 60', but the bidirectional hydraulic cylinder 60' has twice the number of flow rate peaks of the hydraulic cylinder 60 for the same time period. Note that for clarity only one of each maximum instantaneous flow rate 84 and 86 has been labeled in the figures.

The WEC subsystems 54 and 54' do not pump water during certain periods of time. These periods of time vary depending on the specific design of the system. This is due to what is referred to herein as the "latching effect" of the RO desalination subsystem 52. The latching effect is created by the pressure inside the RO desalination subsystem 52 during operation of the WEC subsystem 54 or 54' in the waves. The force created by the float 58 and the drag plate 62 on the hydraulic cylinder 60 or 60' has to be sufficient to overcome the pressure in the RO desalination subsystem 52. Until this occurs, the float 58 is locked in a relatively stable position. In other words, until this force is overcome, the float 58 latches, hence the name "latching effect". During latching, the RO desalination subsystem 52 still produces permeate and brine from seawater provided by the assembly 70 and PSD 76 described above.

As can be seen in FIG. 5A, for the unidirectional hydraulic cylinder 60, there is a latching period 88 before the upward stroke 90 (only one of each of which is labeled for clarity) where the force builds up to the force required to overcome the pressure in the RO desalination subsystem 52. As can be seen in FIG. 5B, for the bidirectional hydraulic cylinder 60', there is a similar latching period 92 before the upward stroke 94 and a second latching period 96 (during the same wave period) before the downward stroke 98 (only one of each of which is labeled for clarity). The downward force builds up during the latching phase 96 as the wave surface elevation lowers and the float mass is enough to overcome the pressure in the RO desalination subsystem 52 and then pump seawater during the downward stroke 98. The flow and pressure in the RO desalination subsystem 52 lowers during the latching periods 88, 92 and 96 as can be seen by line segments 100, 102, 104 (only one of each of which is labeled for clarity). The flow and pressure in the RO desalination subsystem 52 rises during the pumping phases 90, 94, 98 as can be seen by line segments 106, 108, 110 (only one of each of which is labeled for clarity).

The assembly 74 and PSD 76 compensate for the latching periods and therefore enable the use of intermittent pumps such as the unidirectional hydraulic cylinder 60 of the WEC subsystem 54. The FSD 74 and PSD 76 can lead to the cost-effective integration of commercially available RO cells 64 and RO membranes 66 by limiting and smoothing the seawater flow rate at the seawater intake port 68.

Turning now to FIGS. 6A to 21, various embodiments of a wave-actuated system for desalination of water by reverse osmosis will be described. Different embodiments of the wave-actuated system share some common, or at least similar, components. For simplicity, these components have been labeled with the same reference numerals in the figures and their structures and operation will be described in detail only once.

Figure 6A:
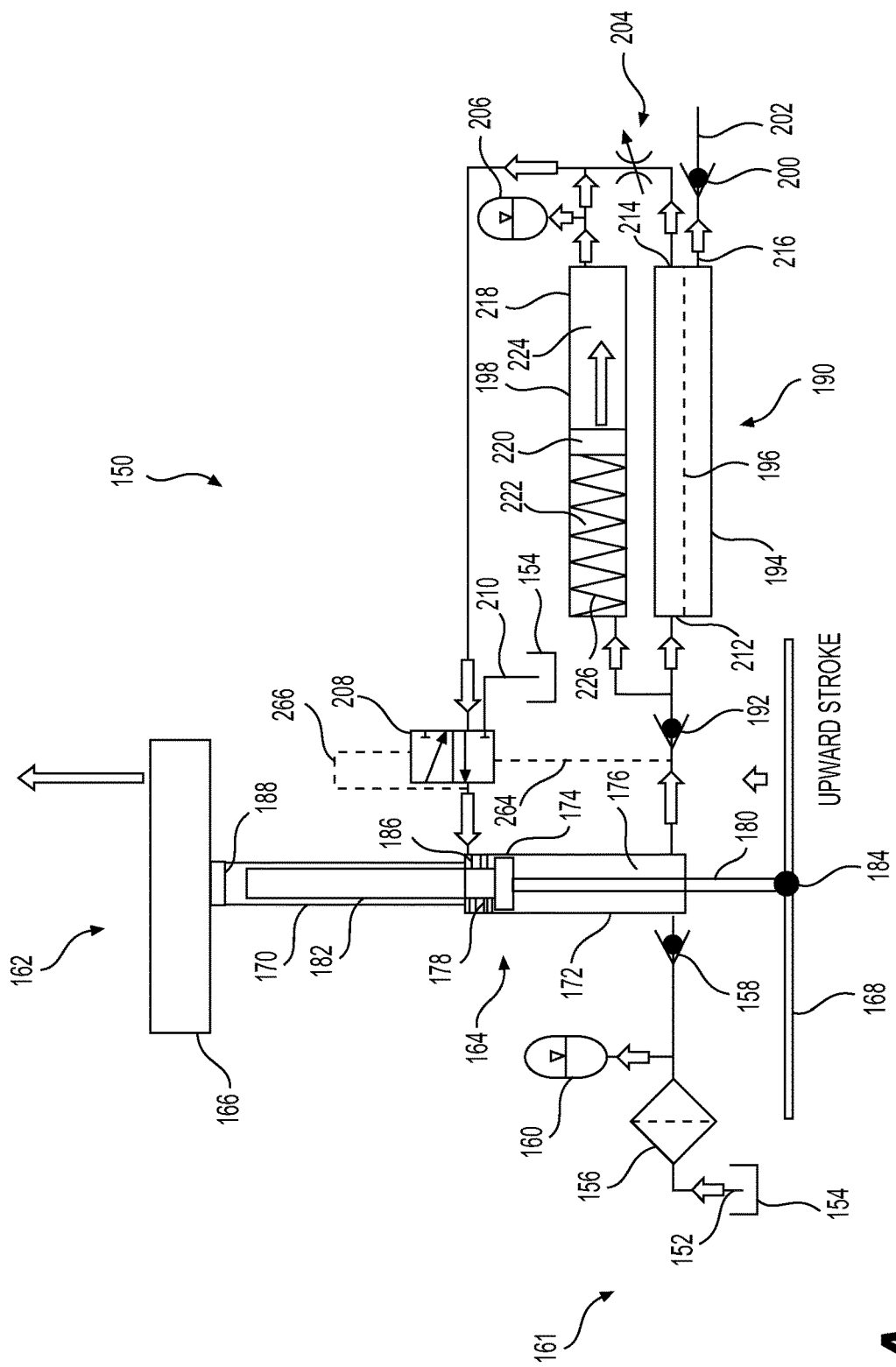
FIG. 6A is a schematic illustration of an embodiment of a wave-actuated system for desalination of water by reverse osmosis of the type illustrated in FIG. 2 at a beginning of an upward stroke.
Figure 6B:
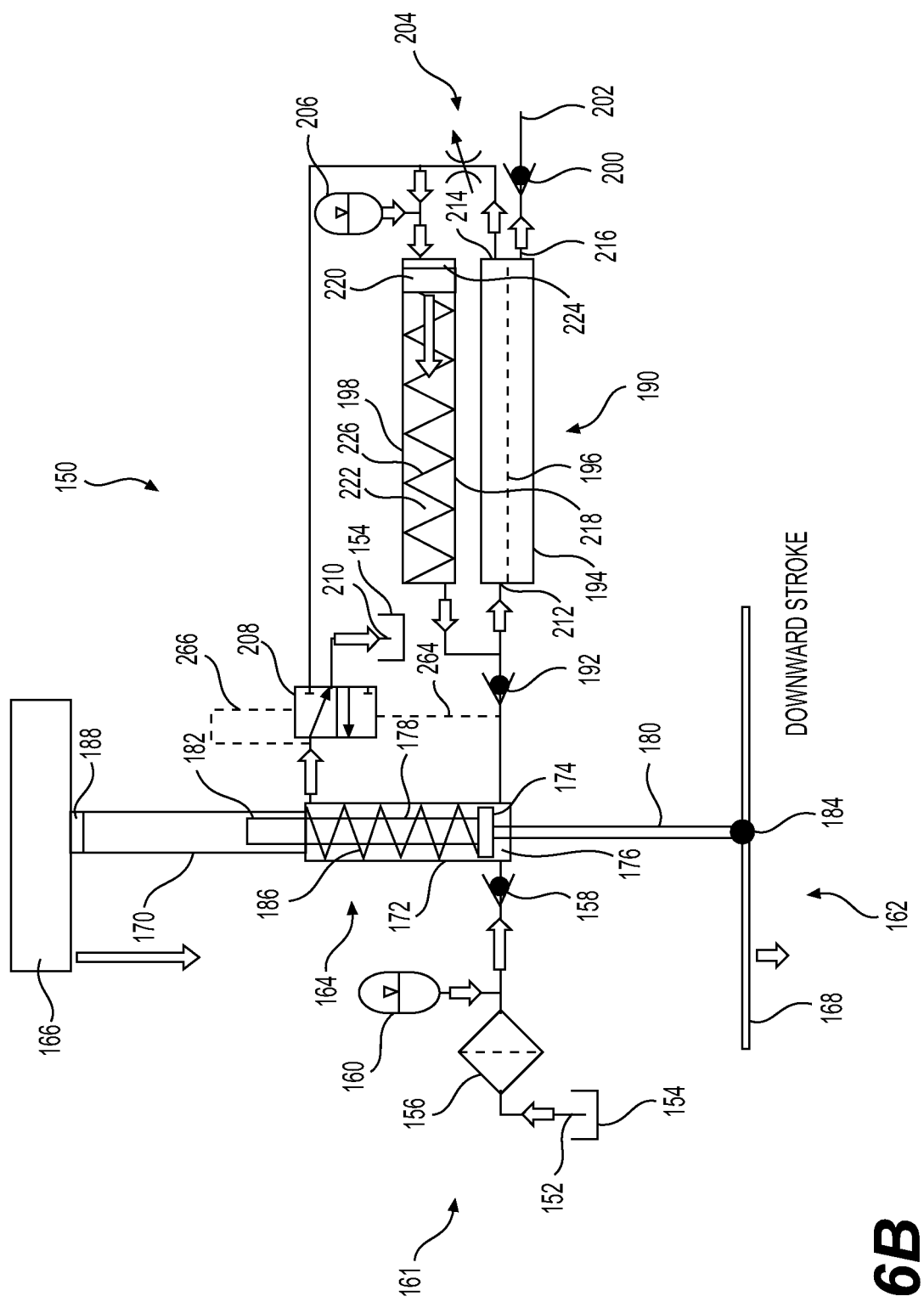
FIG. 6B is a schematic illustration of the wave-actuated system of FIG. 6A at a beginning of a downward stroke.

Turning now to FIGS. 6A and 6B, a wave-actuated system 150 for desalination of water by reverse osmosis will be described. The system 150 illustrated is a system of the type generally described above with respect to FIG. 2.

The system 150 has a seawater intake 152 that communicates with the sea (illustrated by reservoir symbol 154). The seawater intake 152 can be defined by a pipe, pipeline, a hose or any other element permitting the passage of liquid therethrough. Pre-filters 156 are connected in series downstream of the seawater intake 152. Other arrangements of the pre-filters 156 are contemplated. It is also contemplated that a single pre-filter 156 could be used. Different types of pre-filters 156 are contemplated such as media, strainer, cartridge (5-50 microns), or ultrafiltration (dead end). A one-way valve 158 is connected downstream of the pre-filters 156. An accumulator 160 is connected between the pre-filters 156 and the one-way valve 158. The pre-filters 156, the one-way valve 158 and the accumulator 160 together form the pre-filter subsystem 161 of the system 150. The accumulator 160 is provided when the pre-filters 156 are submerged and is omitted when the pre-filters are outside the sea. It is contemplated that the accumulator 160 could also be omitted when the pre-filters 156 are submerged. It is also contemplated that a cross-flow arrangement of ultrafiltration filters could also be integrated to the pre-filter subsystem 161.

The system 150 has a WEC subsystem 162. The WEC subsystem 162 has a hydraulic cylinder 164, a float 166, a reaction member in the form of a drag plate 168, and a frame 170. It is contemplated that a reaction member other than a drag plate 168 could be used.

The hydraulic cylinder 164 has a cylinder body 172 inside which a piston 174 is slidably received. The cylinder body 172 and the piston 174 define two variable volume chambers inside the cylinder body 172: a lower chamber 176 and an upper chamber 178. The one-way valve 158 is hydraulically connected to the lower chamber 176. The hydraulic cylinder 164 also has a lower rod 180 and an upper rod 182. The upper end of the lower rod 180 is rigidly connected to and extends downward from the lower side of the piston 174. The lower end of the lower rod 180 is connected to the drag plate 168 by a connector 184. The connector 184 provides a direct mechanical connection to the drag plate 168. In alternative embodiments, the connector 184 can provide a rigid mechanical connection, by a beam or frame for example, or a flexible connection, by a rope or chain for example. The lower end of the upper rod 182 is rigidly connected to and extends upward from the upper side of the piston 174. In an embodiment, the piston 174 and rods 180, 182 are integrally formed. As can be seen, the upper rod 182 has a bigger diameter than the lower rod 180 for reasons explained in greater detail below. It is contemplated that elastomeric stoppers could be provided inside that top and bottom portions of the cylinder body 172. The stoppers limit the motion of the piston 174 relative to the cylinder body 172 and reduce the impact between the piston 174 and the cylinder body 172 should the piston 174 come into contact with the stoppers. It is also contemplated that the elastomeric stoppers could be combined with hydraulic end stop dampers.

A tension spring 186 is disposed inside the upper chamber 178 and is connected between the piston 174 and the cylinder body 172. The spring 186 biases the piston 174 and the cylinder body 172 toward the position shown in FIG. 6A. It is contemplated that instead of, or in addition to, the spring 186, a compression spring could disposed inside the lower chamber 176 to bias the piston 174 and the cylinder body 172 toward the position shown in FIG. 6A. It is also contemplated that instead of, or in addition to, the spring 186, a secondary float could be connected to the upper rod 182 to help maintain the piston 174 and rods 180, 182 in position during the downward stroke. It is also contemplated that instead of, or in addition to, the spring 186, the hydraulic cylinder 164 could be provided with a hydraulic return. For example, an accumulator could supply pressurized water to the lower chamber 176 during the downward stroke. The hydraulic return provides a more constant force than the spring 186, as the force of the spring 186 varies with its extension.

The frame 170 connects the cylinder body 172 to the float 166 via a connector 188. In one embodiment, the connector 188 provides at least two pivoting degrees of freedom to permit the float 166 to follow the surface of the sea.

The system 150 has a RO desalination subsystem 190. The RO desalination subsystem 190 has a one-way valve 192, a RO cell 194 containing a RO membrane 196, a flow smoothing device (FSD) 198, a one-way valve 200, a permeate pipeline 202, a restriction 204, an accumulator 206, a three-way valve 208 and a brine discharge 210.

As mentioned above, the RO cell 194 contains a RO membrane 196. It is contemplated that multiple RO cells 194 could be used and that each RO cell 194 could contain more than one RO membrane 196. The RO membrane 196 is a semipermeable membrane that, when the pressure upstream of the RO membrane 196 is above the osmotic pressure, removes salt and other effluent materials from the water molecules as the water passes through it. The RO cell 194 has three ports: a seawater intake port 212, a brine exhaust port 214 and a permeate exhaust port 216. As will be described below, seawater enters the RO cell 194 by the seawater intake port 212. The seawater is then separated into permeate and brine inside the RO cell 194 by the RO membrane 196. The permeate exits the RO cell 194 by the permeate exhaust port 216. The brine exits the RO cell 194 by the brine exhaust port 214.

The FSD 198 has a cylinder body 218 inside which a piston 220 is slidably received. The cylinder body 218 and the piston 220 define a variable volume chamber 222 on one side of the piston 220 and a variable volume chamber 224 on the other side of the piston 220. A tension spring 226 is disposed inside the chamber 222 and is connected between the piston 220 and the cylinder body 218. The spring 226 biases the piston 220 toward the end of the cylinder body 218 defining the end of the chamber 222 (i.e. toward the left in the figures). It is contemplated that instead of, or in addition to, the spring 226, a compression spring could be disposed inside the chamber 224 to bias the piston 220 in the same direction. It is also contemplated that instead of, or in addition to the spring 226, the cylinder body 218 could define another volume inside which another piston, connected by a rod to the piston 220, could be provided. By providing pressurized air on one side of this other piston, the recited additional elements would effectively act as an air spring. In another implementation, the piston 220 is replaced by a deformable diaphragm. Embodiments having a diaphragm with and without the spring 226 are both contemplated.

The operation of the wave-actuated system 150 will now be described with respect to FIGS. 6A to 6D. FIGS. 6A and 6B show the positions of the various components of the system 150 at the beginning of an upward stroke and of a downward stroke respectively. FIGS. 6C and 6D show the position of the three-way valve 208 during the upward stroke and the downward stroke respectively.

With reference to FIG. 6A, the operation of the system 150 during the upward stroke will be described. The upward stroke is the result of the float 166 moving upward with a rising wave. As a result of the float 166 moving upward, the frame 170, the cylinder body 172 and the connector 188 move upward with the float 166. Also as a result of the float 166 moving upward, the drag plate 168, the piston 174, the rods 180, 182 and the connector 184 also move upward, but much less than the float 166 as the drag plate 168 resists the motion. As the cylinder body 172 move upward more than the piston 174, there is a relative movement between the cylinder body 172 and the piston 174 that results in the volume of the lower chamber 176 becoming smaller, the volume of the upper chamber 178 becoming larger, and the spring 186 being tensioned.

As the volume of the lower chamber 176 becomes smaller, seawater that was sucked in the lower chamber 176 during the previous downward stroke, as described below, is pushed out of the lower chamber 176. The one-way valve 158 closes and the one-way valve 192 opens such that the seawater flows from the lower chamber 176 through the one-way valve 192. The flow of seawater is then separated. Part of the seawater flows into the RO cell 194 via the seawater inlet port 212 and part of the seawater flows into the chamber 222 of the FSD 198. It is contemplated that the spring 226 could be designed to start stretching only once a certain water pressure differential between the chambers 222 and 224 exists. In embodiments where the pre-filters 156 are submerged, the hydrostatic pressure of the seawater surrounding the pre-filter subassembly 161 causes seawater to flow through the seawater intake 152 and the pre-filters 156 and to then flow into the accumulator 160.

The seawater that flows into the chamber 222 of the FSD 198 increases the volume of the chamber 222 (i.e. the piston 220 moves right with respect to FIG. 6A). As a result, the spring 226 is tensioned and brine that entered the chamber 224 during the previous downward stroke, as described below, is pushed out of the chamber 224.

From the seawater inlet port 212, as the seawater flows into the RO cell 194, the RO membrane 196 permits some water to pass through it. This water (i.e. the water below the RO membrane 196 in FIG. 6A) is desalinated as a result of the reverse osmosis performed by the RO membrane 196. This desalinated water is the permeate. The seawater that does not pass through the RO membrane 196 (i.e. the seawater above the RO membrane 196 in FIG. 6A) thus increases in salt concentration as it flows through the RO cell 194. This higher salt concentration seawater is the brine.

The permeate flows out of the RO cell 194 by the permeate exhaust port 216, flows through the open one-way valve 200 to a permeate discharge, which in the present embodiment is the pipeline 202. The permeate flows to shore inside the pipeline 202. The one-way valve 200 prevents flow back inside the RO cell 194 via the permeate exhaust port 216. In some embodiments, the RO membrane 196 permits pressure to build up inside the pipeline 202 above atmospheric pressure. As a result, no additional pump is required to carry the permeate inside the pipeline 202 to the user.

The brine flows out of the RO cell 194 by the brine exhaust port 214 at a lower pressure than the pressure of seawater entering the RO cell 194 by the seawater inlet port 212. The brine then flows through the restriction 204. The restriction 204 can be a needle valve, an orifice or a flow control valve for example. The restriction 204 causes the brine pressure to drop. This pressure drop facilitates the movement of the piston 220 inside the cylinder body 218 to facilitate the accumulation of seawater in the chamber 222. From the restriction 204, the brine flows to the three-way valve 208. It is contemplated that the level of pressure drop provided by the restriction 204 could be controlled by an electric or hydraulic controller adjusting the restriction 204. The adjustment of the restriction 204 can be made based on one or more of the state of the sea (i.e. wave height and period) and pressure drop across the RO membrane 194 in view of information provided by various sensors to the controller. An adjustable restriction 204 could also be adjusted over the life of the RO membrane 194 to take into account any clogging of the RO membrane 194 that could occur over time.

Some of the brine that exits the chamber 224 of the FSD 198 enters the accumulator 206 and the rest flows to the three-way valve 208. Thus, the accumulator 206 prevents pressure inside the RO desalination subsystem 190 to significantly increase during the upward stroke. It is contemplated that the accumulator 206 could be connected anywhere between the three-way valve 208 and the restriction 204 or the FSD 198.

With reference to FIG. 6C, the three-way valve 208 has a valve body 250 and a slidable valve element 252 inside the valve body 250. The valve body 250 defines three flow ports 254, 256, 258 and two pilot ports 260, 262. With reference to FIG. 6A, the flow port 254 is hydraulically connected to the chamber 224 of the FSD 198 and to the restriction 204, the flow port 256 is hydraulically connected to the brine discharge 210, and the flow port 258 is hydraulically connected to the chamber 178 of the hydraulic cylinder 164.

Also with reference to FIG. 6A, the pilot port 260 is hydraulically connected by pilot line 264 between the lower chamber 176 of the hydraulic cylinder 164 and the one-way valve 192 and the pilot port 262 is hydraulically connected by pilot line 266 between the upper chamber 178 of the hydraulic cylinder 164 and the three-way valve 208. It is contemplated that instead of being actuated hydraulically via pilot ports, the three-way valve 208 could be electrically actuated. In such an embodiment, a controller receiving signals from one or more pressure sensors and/or piston position sensors would send actuation signals to an electric actuator connected to the valve in order to place the valve in the proper configuration.

During the upward stroke, pressure supplied by the pilot line 264 to the pilot port 260 of the three-way valve 208 is higher than the pressure supplied by the pilot line 266 to the pilot port 262. As a result, the valve element 252 moves to the position shown in FIG. 6C. In this position, the valve element 252 closes the flow port 256 and creates a passage through the three-way valve 208 from the flow port 254 to the flow port 258. This allows brine from the chamber 224 of the FSD 198 and from the restriction 204 to enter the upper chamber 178 of the hydraulic cylinder 164.

By causing brine to flow into the upper chamber 178 of the hydraulic cylinder 164, the force required to pump the seawater is lowered than if the brine was discharged directly from the brine exhaust port 214 to the RO cell 194. Thus, the buoyancy of the float 166 can be smaller, thereby permitting the use of a smaller float 166 compared to systems where energy from the brine flow is not recovered.

As previously mentioned, the upper rod 182 has a larger diameter than the lower rod 180. The diameters of the rods 180, 182 and the internal diameter of the cylinder body 172 are selected to control the recovery ratio of the RO cell 194. For example, for an RO cell 194 converting 20 percent of the seawater entering the RO cell 194 to permeate, therefore leaving 80 percent of the seawater flowing as brine to the upper chamber 178, the diameter of the rods 180, 182 have to be selected such that the annular surface area of the piston 174 around the upper rod 182 is 80 percent of the annular surface area of the piston 174 around the lower rod 180.

In an example where the RO cell 194 converts 20 percent of the seawater to permeate, the pressure in the lower chamber 176 is 60 bars and the pressure inside the upper chamber 178 is 55 bars due to the previously mentioned pressure drops, the recovery of the brine into the upper chamber 178 leads to a pumping force reduction of 73.3 percent compared to systems where the energy from the brine flow is not recovered.

Turning now to FIG. 6B, the operation of the system 150 during the downward stroke will be described. The downward stroke is the result of the float 166 moving downward with a descending wave. As a result of the float 166 moving downward, the frame 170, the cylinder body 172 and the connector 188 move downward with the float 166. Also as a result of the float 166 moving downward, the drag plate 168, the piston 174, the rods 180, 182 and the connector 184 also move downward, but much less than the float 166 as the drag plate 168 resists the motion. As the cylinder body 172 move downward more than the piston 174, there is a relative movement between the cylinder body 172 and the piston 174 that results in the volume of the lower chamber 176 becoming larger, the volume of the upper chamber 178 becoming smaller. The force stored in the spring 186 during the upward stroke is released to assist the relative movement between the cylinder body 172 and the piston 174.

As the volume of the lower chamber 176 becomes larger, seawater is sucked through the seawater intake 152, the pre-filters 156, and the one-way valve 158, which is now open, into the lower chamber 176. The one-way valve 192 is closed. In embodiments where the accumulator 160 is provided, seawater accumulated in the accumulator 160 also flows through the one-way valve 158 and into the lower chamber 176. This flow of seawater from the accumulator 160 reduces the instantaneous flow of seawater in the pre-filters 156, thus reducing the instantaneous pressure drop across the pre-filters 156.

The seawater that accumulated into the chamber 222 of the FSD 198 during the previous upward stroke, is pushed out of the chamber 222 by the piston 220 being pulled by the spring 226. As a result, the seawater stored in the chamber 222 flows from the chamber 222 into the RO cell 194 by the seawater inlet port 212. As during the upward stroke, seawater that enters the RO cell 194 by the seawater inlet port 212 exits the RO cell 194 as permeate from the permeate exhaust port 216 and as brine from the brine exhaust port 214. Therefore, permeate is generated during both the upward stroke and the downward stroke even through the WEC subsystem 162 only pumps seawater into the RO desalination subsystem 190 during the upward stroke. During the upward stroke, seawater is supplied to the RO cell 194 by the hydraulic cylinder 164. During the downward stroke, seawater is supplied to the RO cell 194 by the FSD 198. As the FSD 198 compensates for the intermittent seawater supply from the hydraulic cylinder 164, it is said to smooth the seawater flow and pressure to the RO cell 194, hence the name flow-smoothing device.

From the brine exhaust port 214, the brine flows through the restriction 204. From the restriction 204, the brine flows into the chamber 224 of the FSD 198. Brine also flows out of the accumulator 206 into the chamber 224 of the FSD 198 to compensate for the volume of water that exited the RO desalination subsystem 190 as permeate. Thus, the accumulator 206 prevents pressure inside the RO desalination subsystem 190 to significantly decrease during the downward stroke. As the accumulator 206 regulates, or smooths, the pressure inside the RO desalination subsystem 190 during the upward and downward strokes, the accumulator 206 acts as the pressures smoothing device (PSD) of the system 150.

During the downward stroke, pressure supplied by the pilot line 264 to the pilot port 260 of the three-way valve 208 is lower than the pressure supplied by the pilot line 266 to the pilot port 262. As a result, the valve element 252 moves to the position shown in FIG. 6D. In this position, the valve element 252 closes the flow port 254 and creates a passage through the three-way valve 208 from the flow port 258 to the flow port 256. This allows brine from the upper chamber 178 of the hydraulic cylinder 164 to flow through the three-way valve 208 and out of the system 150 by the brine discharge 210.

It is contemplated that the three-way valve 208 could be replaced by a pair of hydraulically piloted or electrically actuated valves. One valve is connected between the brine exhaust port 214 and the upper chamber 178 and opens to permit brine flow into the upper chamber 178 during the upward stroke and closes during the downward stroke. The other valve is connected between the upper chamber 178 and the brine discharge 210 and open to permit brine flow from the upper chamber 178 to the brine discharge 210 during the upward stroke and closes during the upward stroke.

It is also contemplated that the upper rod 182 could be connected to the float 166 and the cylinder body 172 could be connected to the drag plate 168. In such an embodiment, components of the system 150 that are described above as being hydraulically connected to the lower chamber 176 would now be hydraulically connected to the upper chamber 178 and components of the system 150 that are described above as being hydraulically connected to the upper chamber 178 would be hydraulically connected to the lower chamber 176. In such an embodiment, the lower rod 180 would have a larger diameter than the upper rod 182. Also, in such an embodiment, the events described above as occurring during the upward stroke would now occur during the downward stroke, and vice versa.

Figure 7:
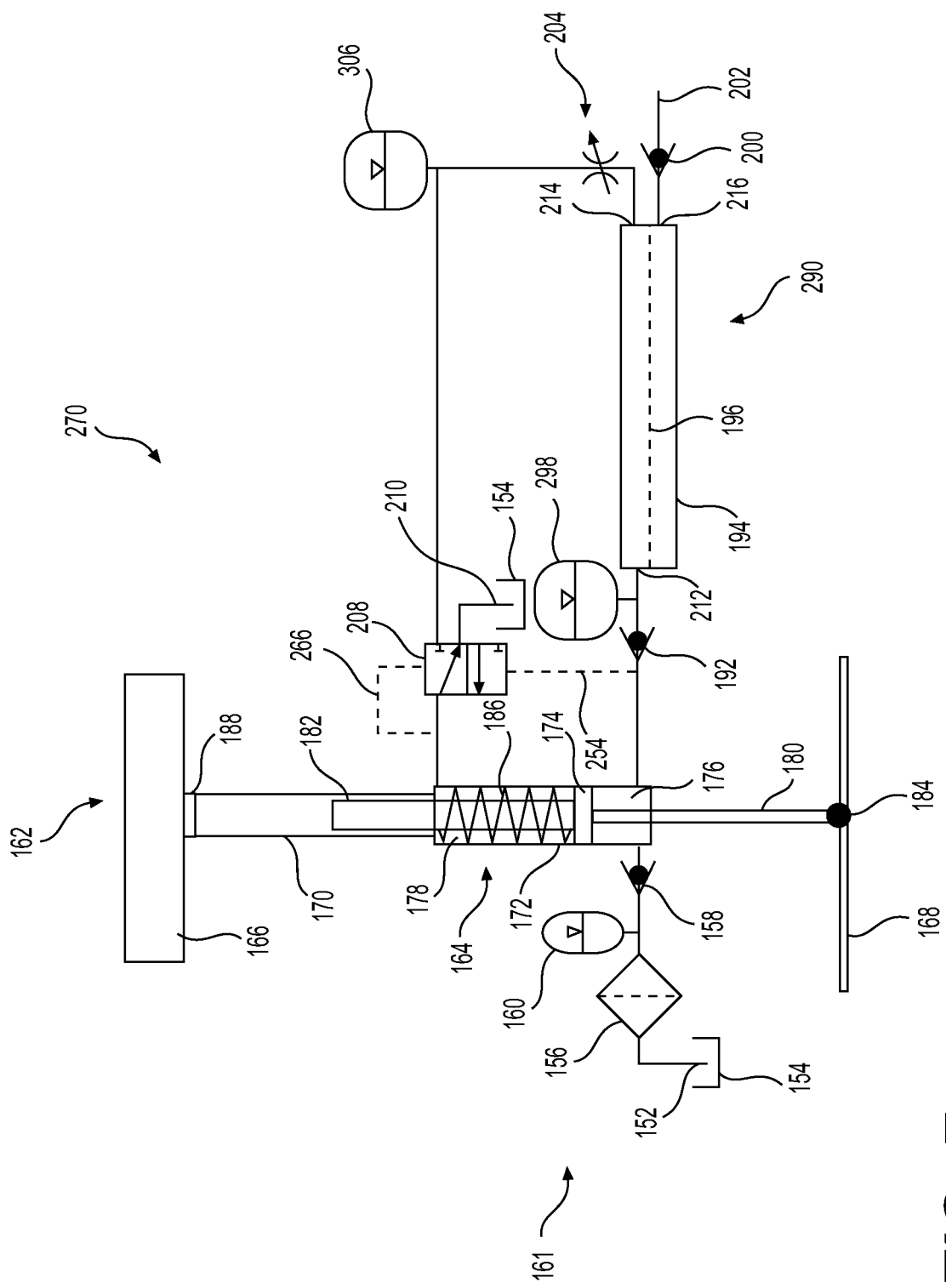
FIG. 7 is a schematic illustration of an alternative embodiment of the wave-actuated system of FIG. 6A during a downward stroke.

Turning now to FIG. 7, a wave-actuated system 270 for desalination of water by reverse osmosis will be described. The system 270 is similar to the system 150 described above except that the FSD 198 has been replaced by an alternative embodiment of a FSD in the form of an accumulator 298 and the accumulator 206 has been replaced by two accumulators 306 (only one of which is shown). The accumulator 298 is hydraulically connected between the one-way valve 192 and the seawater inlet port 212 of the RO cell 194. The accumulators 306 are hydraulically connected between the restriction 204 and the three-way valve 208.

During the upward stroke, seawater flows from the lower chamber 176 of the hydraulic cylinder 164 through the one-way valve 192. From the one-way valve 192, some of the seawater flows through the RO cell 194 via the seawater inlet port 212 as described above with respect to the system 150 and some of the seawater flows into the accumulator 298. As a result, pressure inside the accumulator 298 increases.

During the downward stroke, the one-way valve 192 is closed. Seawater that accumulated in the accumulator 298 during the upward stroke now flows out of the accumulator 298 and flows into the RO cell 194 via the seawater inlet port 212. As a result, brine and permeate continue to flow out of the brine and permeate exhaust ports 214, 216 respectively during the downward stroke. As the flow port 254 of the three-way valve 208 is closed during the downward stroke, brine flowing out of the brine exhaust port 214 during the downward stroke accumulates inside the accumulators 306. During the next upward stroke, at least some of the brine inside the accumulators 306 flows through the three-way valve 208 and into the upper chamber 178 of the hydraulic cylinder 164 with brine flowing from the brine exhaust port 214.

Figure 8:
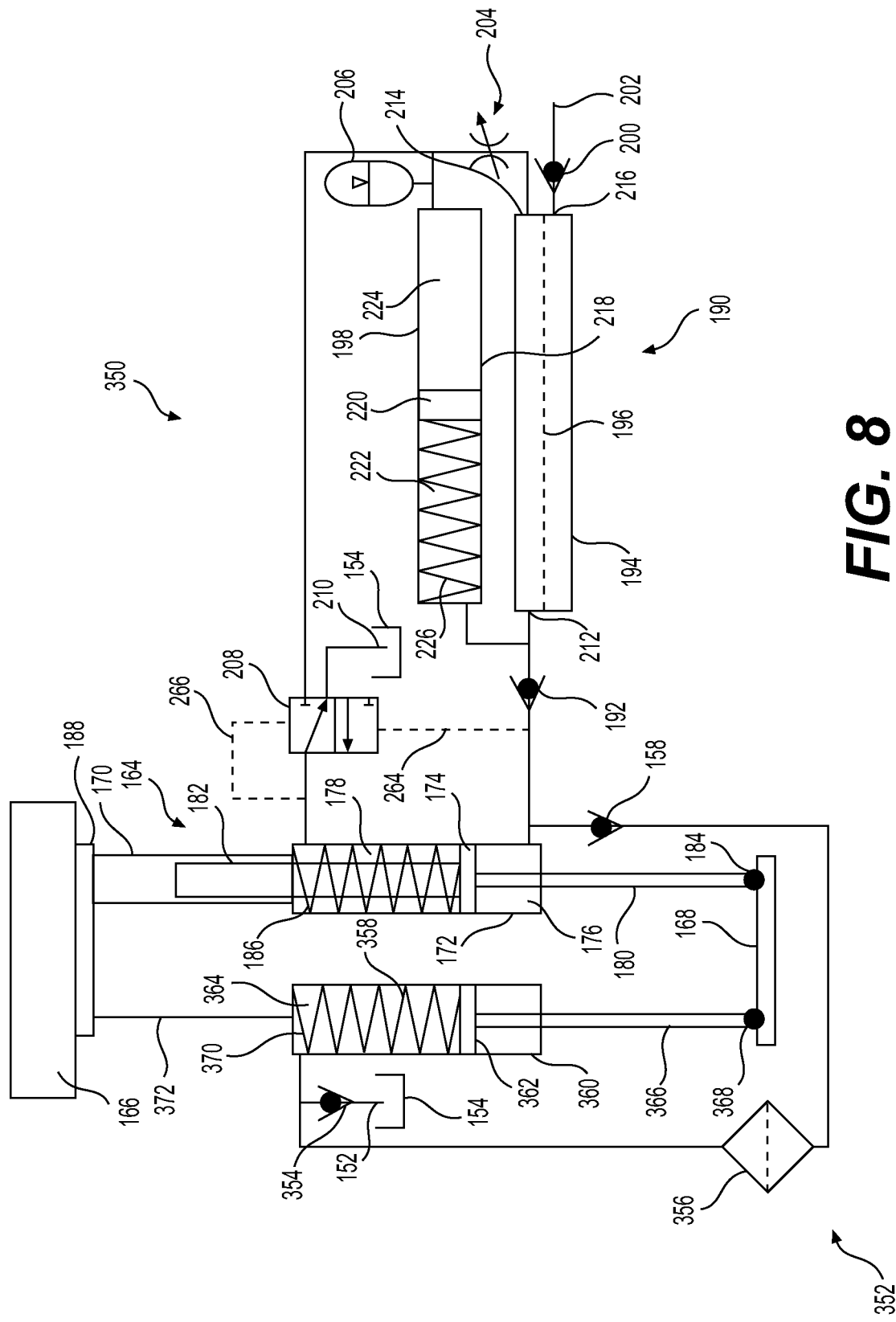
FIG. 8 is a schematic illustration of an embodiment of a wave-actuated system for desalination of water by reverse osmosis of the type illustrated in FIG. 4 during a downward stroke.

Turning now to FIG. 8, a wave-actuated system 350 for desalination of water by reverse osmosis will be described. The system 350 illustrated is a system of the type generally described above with respect to FIG. 4. The system 350 is similar to the system 150 described above except that the pre-filter subsystem 161 has been replaced by a pre-filter subsystem 352.

The pre-filter subsystem 352 has a one-way valve 354 connected downstream of the seawater intake 152, positive pressure pre-filters 356 and a low pressure hydraulic cylinder 358 connected downstream of the one-way valve 354 and the one-way valve 158 connected downstream of the pre-filters 356. The pre-filters 356 are connected in series. Other arrangements of the pre-filters 356 are contemplated. It is also contemplated that a single pre-filter 356 could be used.

The low pressure hydraulic cylinder 358 has a cylinder body 360 inside which a piston 362 is slidably received. The cylinder body 360 and the piston 362 define a variable volume chamber 364 inside the cylinder body 360 above the piston 362. The chamber 364 is hydraulically connected to the pre-filters 356. The hydraulic cylinder 358 also has a rod 366. The upper end of the rod 366 is rigidly connected to and extends downward from the lower side of the piston 362. The lower end of the rod 366 is connected to the drag plate 168 by a connector 368. In an alternative embodiment, the lower end of the rod 366 is connected to the lower rod 180 of the hydraulic cylinder 164. In an embodiment, the piston 362 and the rod 366 are integrally formed. A tension spring 370 is disposed inside the chamber 364 and is connected between the piston 362 and the cylinder body 360. The spring 370 biases the upper end of the cylinder body 360 and the piston 362 toward each other. A frame 372 connects the cylinder body 360 to the float 166 via the connector 188. It is contemplated that the frame 372 could be connected to the float 166 by a connector separate from the connector 188. In an alternative embodiment, the frame 372 connects the cylinder body 360 to the frame 170 and/or to the cylinder body 172. As a result of this connection of the hydraulic cylinder 358, the piston 362 and the cylinder body 360 move relative to each other at the same speed as the piston 174 and the cylinder body 172.

During the upward stroke, seawater is sucked into the chamber 364 from the seawater intake 152 via the one-way valve 354. During the downward stroke, the seawater inside the chamber 364 is pushed out of the chamber 364 and then flows through the pre-filters 356, the one-way valve 158 and into the lower chamber 176. The one-way valve 354 prevents seawater to flow out of the pre-filter subsystem 352 via the seawater intake 152 during the downward stroke.

Figure 9:
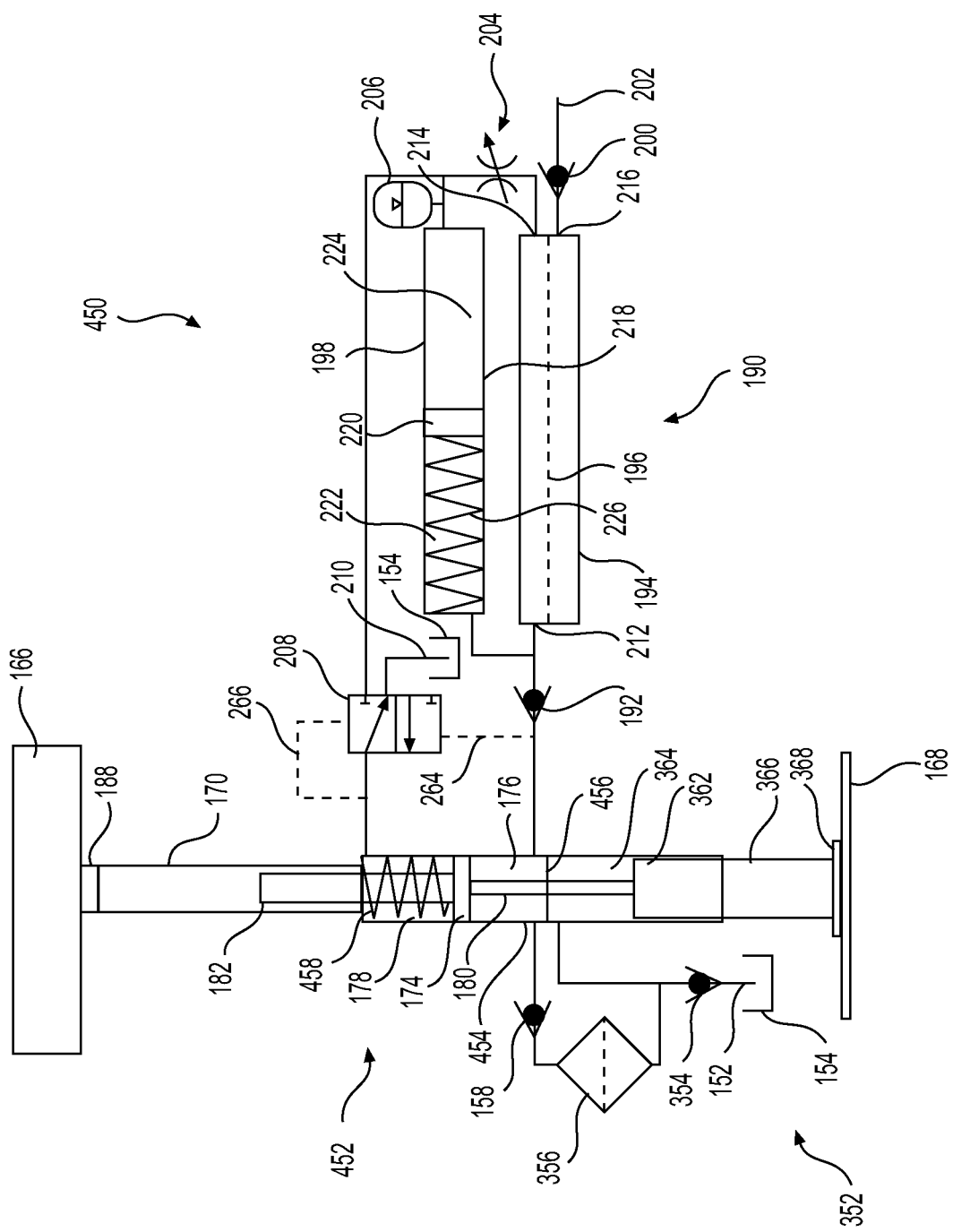
FIG. 9 is a schematic illustration of an alternative embodiment of the wave-actuated system of FIG. 8 during a downward stroke.

Turning now to FIG. 9, a wave-actuated system 450 for desalination of water by reverse osmosis will be described. The system 450 is similar to the system 350 described above with respect to FIG. 8 except that the hydraulic cylinders 164 and 358 have been replaced by a three-chamber hydraulic cylinder 452.

The hydraulic cylinder 452 has a cylinder body 454 having a separating wall 456. The piston 174 is disposed in the cylinder body 454 above the wall 456. The lower chamber 176 is defined between the piston 174 and the wall 456. The upper chamber 178 is defined above the piston 174. The piston 362 is disposed in the cylinder body 454 below the wall 456. The chamber 364 is defined between the piston 362 and the wall 456. The lower rod 180 extends from the bottom of the piston 174, passes through an aperture in the wall 456 and connects to the top of the piston 362 such that both pistons 174, 362 reciprocate together. Seals (not shown) are provided on the rim of the aperture in the wall 456 around the rod 180. The rod 366 extends from the bottom of the piston 362 and connects to the drag plate 168 with connector 368. The springs 186 and 370 are replaced by a single spring 458 disposed in the upper chamber 178. It is contemplated that the spring 458 could be disposed in the lower chamber 176 or the chamber 364. It is also contemplated that more than one of the chambers 176, 178, 364 could have a spring provided therein. The system 450 operates in the same manner as the system 350, but can be more compact than the system 350.

Figure 10:
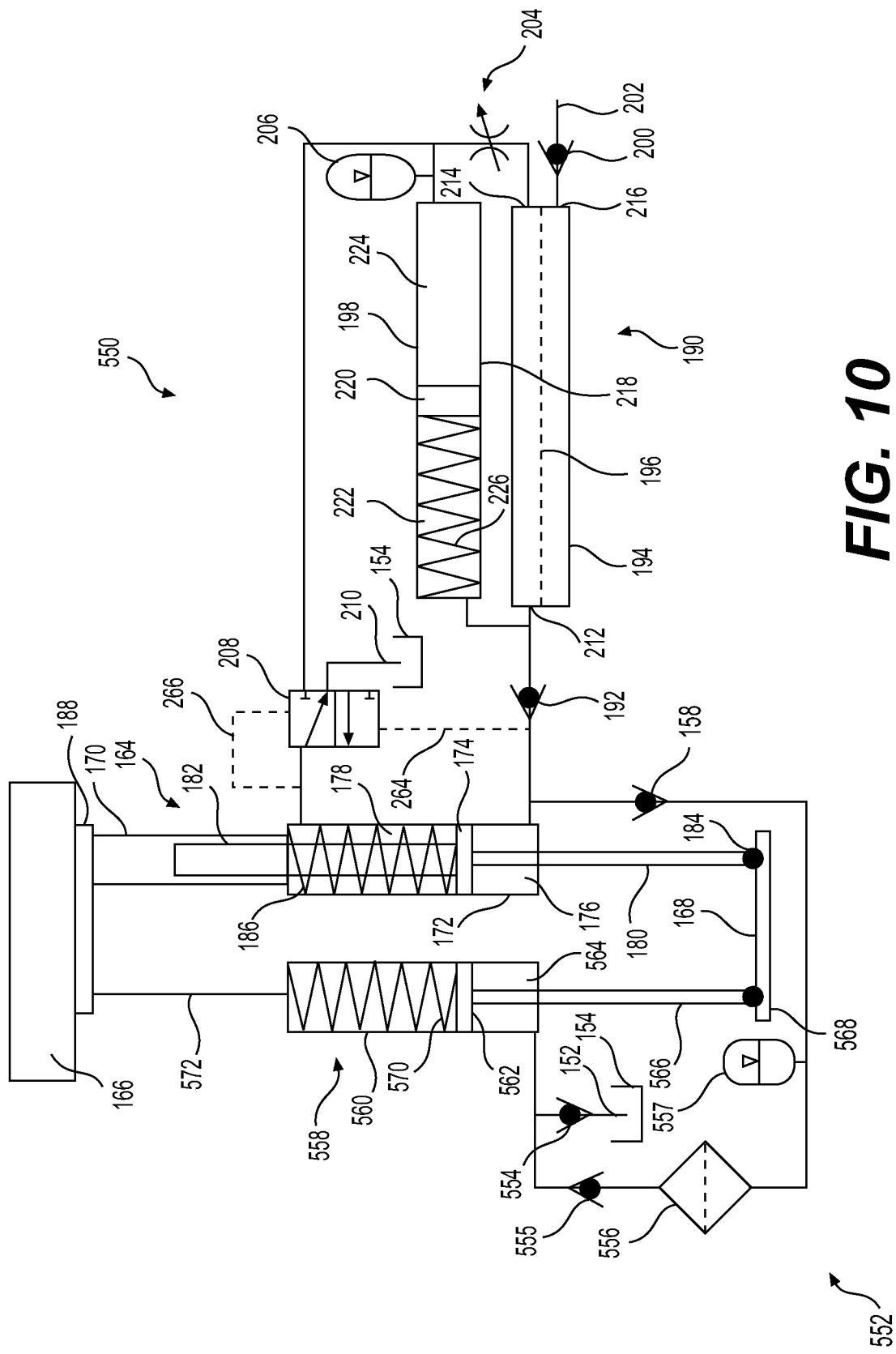
FIG. 10 is a schematic illustration of another alternative embodiment of the wave-actuated system of FIG. 8 during a downward stroke.

Turning now to FIG. 10, a wave-actuated system 550 for desalination of water by reverse osmosis will be described. The system 550 is similar to the system 350 described above with respect to FIG. 8 except that the pre-filter subsystem 352 has been replaced by a pre-filter subsystem 552.

The pre-filter subsystem 552 has a one-way valve 554 connected downstream of the seawater intake 152, positive pressure pre-filters 556 and a low pressure hydraulic cylinder 558 connected downstream of the one-way valve 554, a one-way valve 555 connected between the pre-filters 556 and the hydraulic cylinder 558, the one-way valve 158 connected downstream of the pre-filters 556 and an accumulator 557 connected between the pre-filters 556 and the one-way valve 158. The pre-filters 556 are connected in series. Other arrangements of the pre-filters 556 are contemplated. It is also contemplated that a single pre-filter 556 could be used.

The low pressure hydraulic cylinder 558 has a cylinder body 560 inside which a piston 562 is slidably received. The cylinder body 560 and the piston 562 define a variable volume chamber 564 inside the cylinder body 560 below the piston 562. The chamber 564 is hydraulically connected to the pre-filters 556 via the one-way valve 555. The hydraulic cylinder 558 also has a rod 566. The upper end of the rod 566 is rigidly connected to and extends downward from the lower side of the piston 562. The lower end of the rod 566 is connected to the drag plate 168 by a connector 568. In an alternative embodiment, the lower end of the rod 566 is connected to the lower rod 180 of the hydraulic cylinder 164. In an embodiment, the piston 562 and the rod 566 are integrally formed. A tension spring 570 is disposed inside the cylinder body 560 above the piston 562 and is connected between the piston 562 and the cylinder body 560. The spring 570 biases the upper end of the cylinder body 560 and the piston 562 toward each other. A frame 572 connects the cylinder body 560 to the float 166 via a the connector 188. It is contemplated that the frame 572 could be connected to the float 166 by a connector separate from the connector 188. In an alternative embodiment, the frame 572 connects the cylinder body 560 to the frame 170 and/or to the cylinder body 172. As a result of this connection of the hydraulic cylinder 558, the piston 562 and the cylinder body 560 move relative to each other at the same speed as the piston 174 and the cylinder body 172.

During the upward stroke, the one-way valve 555 is open and the one-way valves 554, 158 are closed. The seawater inside the chamber 564 is pushed out of the chamber 564 and then flows through the one-way valve 555, through the pre-filters 556 and the one-way valve 158 and then flows into the accumulator 557, thereby increasing the pressure inside the accumulator 557. The one-way valve 554 prevents seawater to flow out of the pre-filter subsystem 552 via the seawater intake 152 during the upward stroke.

During the downward stroke, the one-way valve 555 is closed and the one-way valves 554, 158 are opened. Seawater is sucked into the chamber 564 from the seawater intake 152 via the one-way valve 554. At least some of the seawater that has accumulated inside the accumulator 557 flows out of the accumulator 557, flows through the one-way valve 158 and then flows into the lower chamber 176 of the hydraulic cylinder 164. The pressure of the seawater flowing inside the lower chamber 176 applies a restoring force that assists in moving the cylinder body 172 downward relative to the piston 174. As such, it is contemplated that the spring 186 could be omitted.

Figure 11:
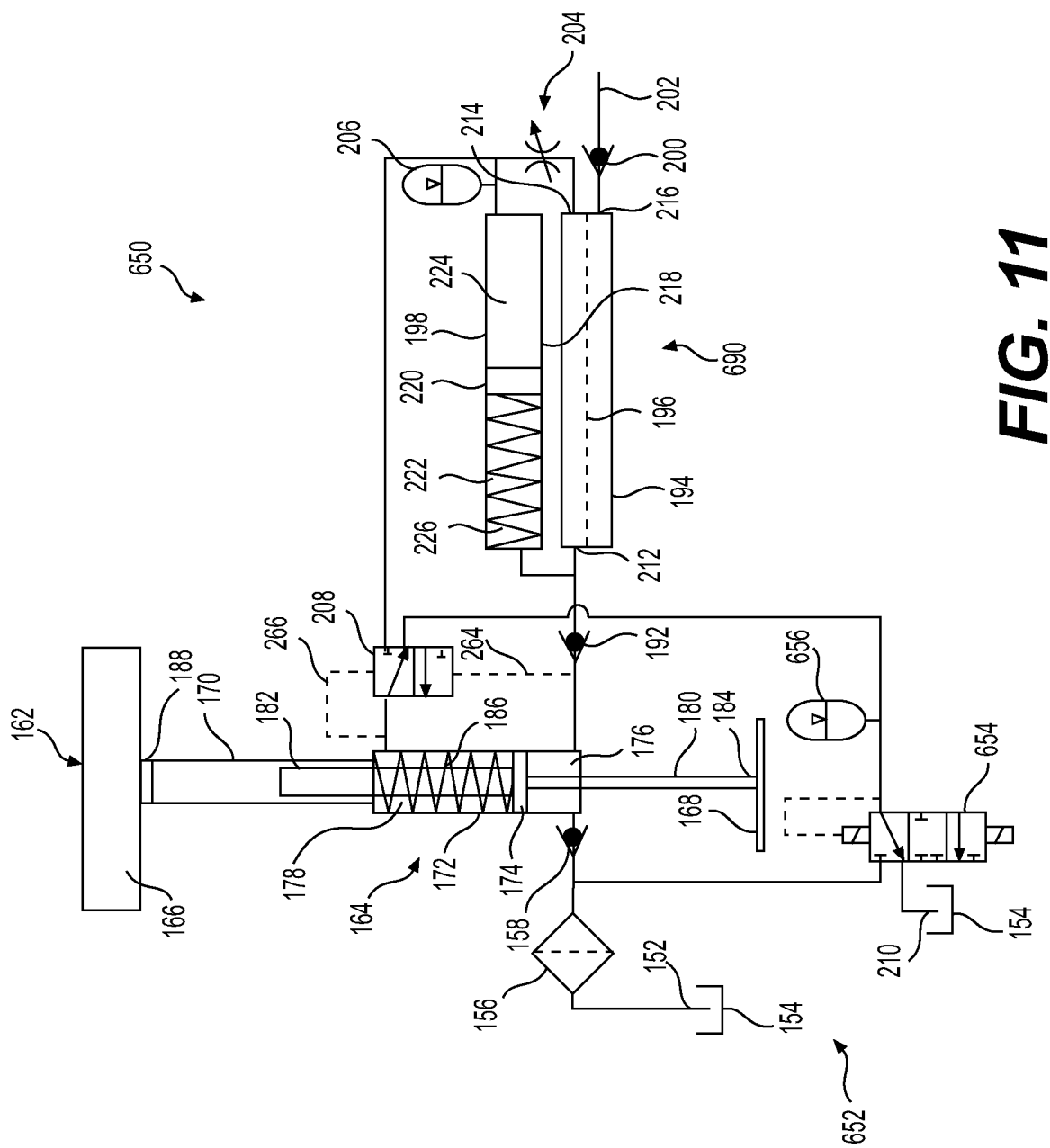
FIG. 11 is a schematic illustration of another alternative embodiment of the wave-actuated system of FIG. 6A during a downward stroke.

Turning now to FIG. 11, a wave-actuated system 650 for desalination of water by reverse osmosis will be described. The system 650 is similar to the system 150 described above with respect to FIGS. 6A and 6B except that the pre-filter subsystem 161 has been replaced with a pre-filter subsystem 652.

The pre-filter subsystem 652 has the pre-filters 156, the one-way valve 158, a low pressure directional valve 654 and an accumulator 656. The directional valve 654 is a three-way, three-position valve. The directional valve 654 has a first position (shown in FIG. 11) that hydraulically communicates the flow port 256 (FIG. 6D) of the three-way valve 208 with the brine discharge 210. The directional valve 654 has a second position that hydraulically communicates the accumulator 656 with the pre-filters 156 to permit backwashing of the pre-filters 156 as discussed below. The directional valve 654 has a third position blocking the flow of brine from the flow port 256 of the three-way valve 208 to the brine discharge 210 and to the pre-filters 156. The accumulator 656 is connected between the flow port 256 of the three-way valve 208 and the directional valve 654.

During normal operation, the directional valve 654 is in the first position to permit brine to flow from the flow port 256 of the three-way valve 208 to the brine discharge 210 via the directional valve 654 during the downward stroke.

When backwashing of the pre-filters 156 is desired, the directional valve 654 is moved to its third position. As such, during the downward stroke, brine flowing from the flow port 256 of the three-way valve 208 flows into the accumulator 656, and pressure builds up inside the accumulator 656. When the accumulator 656 if full or has reached a predetermined pressure, the directional valve 654 is moved to its second position. As a result, brine flows out of the accumulator 656, flows through the directional valve 654, then flows through the pre-filters 156, thereby backwashing them, and then flows out of the system 650 by the seawater intake 152. Once the accumulator 656 is empty or is below a predetermined pressure, the directional valve 654 is returned to its first position. As the brine was filtered by the pre-filters 156, it does not contain particles that could be harmful for the pre-filters 156 when it is used to backwash the pre-filters 156. By backwashing the pre-filters 156, it is believed that the life of the pre-filters 156 can be increased and that the time between manual maintenance cycles of the pre-filters 156 can be increased.

It is contemplated that the directional valve 654 could be actuated by one or more hydraulic pilots or by an electrically controlled actuator such as a solenoid. It is also contemplated that the directional valve 654 could be hydraulically or electrically controlled by a timer or based on the pressure differential across the pre-filters 156. A high pressure differential across the pre-filters 156 generally indicates that they are clogged and that they need to be backwashed.

Figure 12:
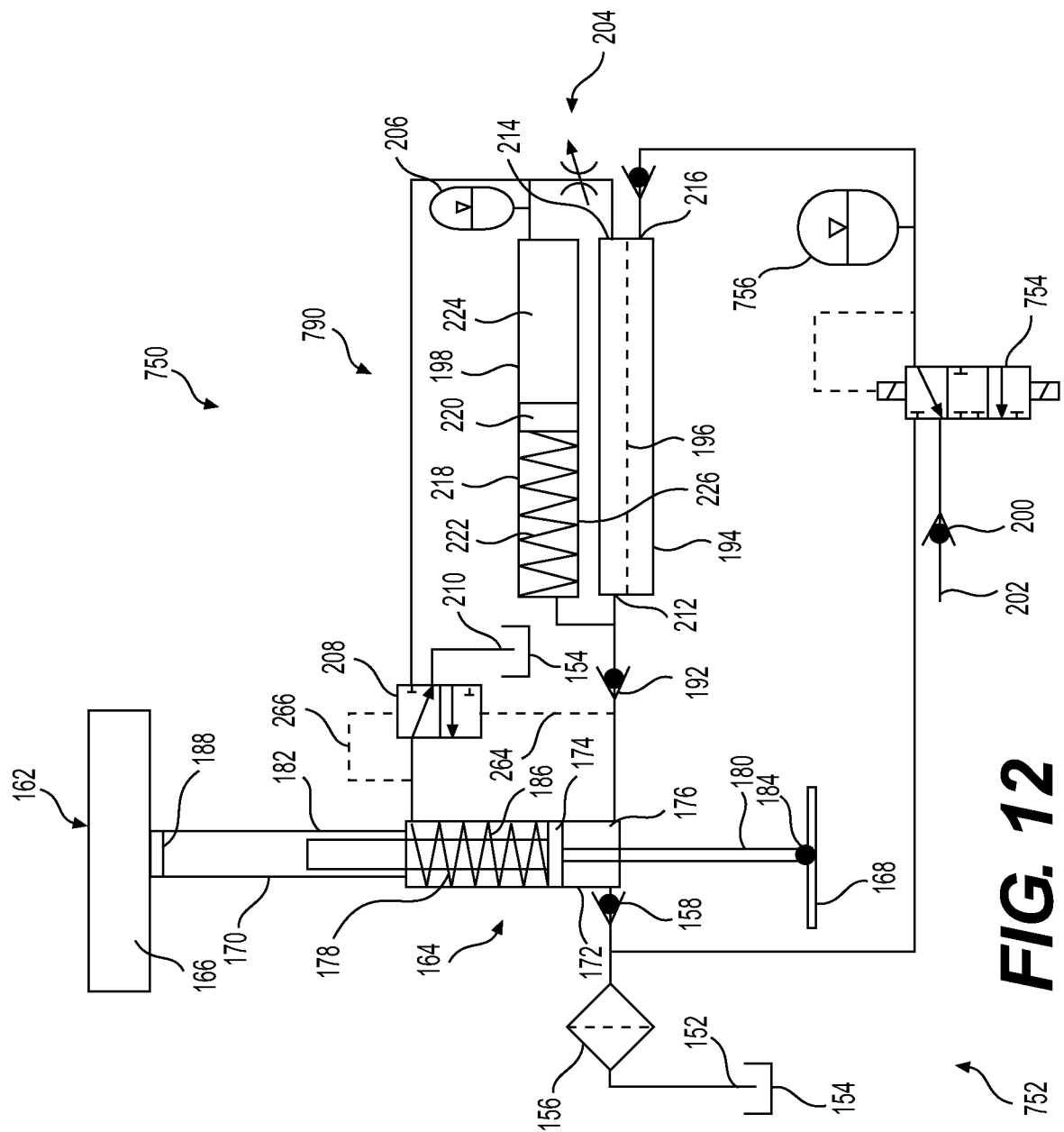
FIG. 12 is a schematic illustration of another alternative embodiment of the wave-actuated system of FIG. 6A during a downward stroke.

Turning now to FIG. 12, a wave-actuated system 750 for desalination of water by reverse osmosis will be described. The system 750 is similar to the system 650 described above with respect to FIG. 11 except that the pre-filter subsystem 652 has been replaced with a pre-filter subsystem 752. While the pre-filter subsystem 652 permits backwashing of the pre-filters 156 with brine, the pre-filter subsystem 754 permits backwashing of the pre-filters 156 with permeate.

The pre-filter subsystem 752 has the pre-filters 156, the one-way valve 158, a low pressure directional valve 754 and an accumulator 756. The directional valve 754 is a three-way, three-position valve. The directional valve 754 has a first position (shown in FIG. 12) that hydraulically communicates the permeate exhaust port 216 of the RO cell 194 with the permeate pipeline 202 via the one-way valve 200. The directional valve 754 has a second position that hydraulically communicates the accumulator 756 with the pre-filters 156 to permit backwashing of the pre-filters 156 as discussed below. The directional valve 754 has a third position blocking the flow of permeate from the permeate exhaust port 216 of the RO cell 194 to the permeate pipeline 202 and to the pre-filters 156. The accumulator 756 is connected between the permeate exhaust port 216 of the RO cell 194 and the directional valve 754.

During normal operation, the directional valve 754 is in the first position to permit permeate to flow from the permeate exhaust port 216 of the RO cell 194 to the permeate pipeline 202 via the directional valve 754.

When backwashing of the pre-filters 156 is desired, the directional valve 754 is moved to its third position. As such, permeate flowing from the permeate exhaust port 216 of the RO cell 194 flows into the accumulator 756, and pressure builds up inside the accumulator 756. When the accumulator 756 if full or has reached a predetermined pressure, the directional valve 754 is moved to its second position. As a result, permeate flows out of the accumulator 756, flows through the directional valve 754, then flows through the pre-filters 156, thereby backwashing them, and then flows out of the system 750 by the seawater intake 152. Once the accumulator 756 is empty or is below a predetermined pressure, the directional valve 754 is returned to its first position. As the permeate was filtered by the pre-filters 156 and the RO membrane 196, it does not contain particles that could be harmful for the pre-filters 156 when it is used to backwash the pre-filters 156. By backwashing the pre-filters 156, it is believed that the life of the pre-filters 156 can be increased and that the time between manual maintenance cycles of the pre-filters 156 can be increased.

It is contemplated that the directional valve 754 could be actuated by one or more hydraulic pilots or by an electrically controlled actuator such as a solenoid. It is also contemplated that the directional valve 754 could be hydraulically or electrically controlled by a timer or based on the pressure differential across the pre-filters 156. A high pressure differential across the pre-filters 156 generally indicates that they are clogged and that they need to be backwashed.

Figure 13:
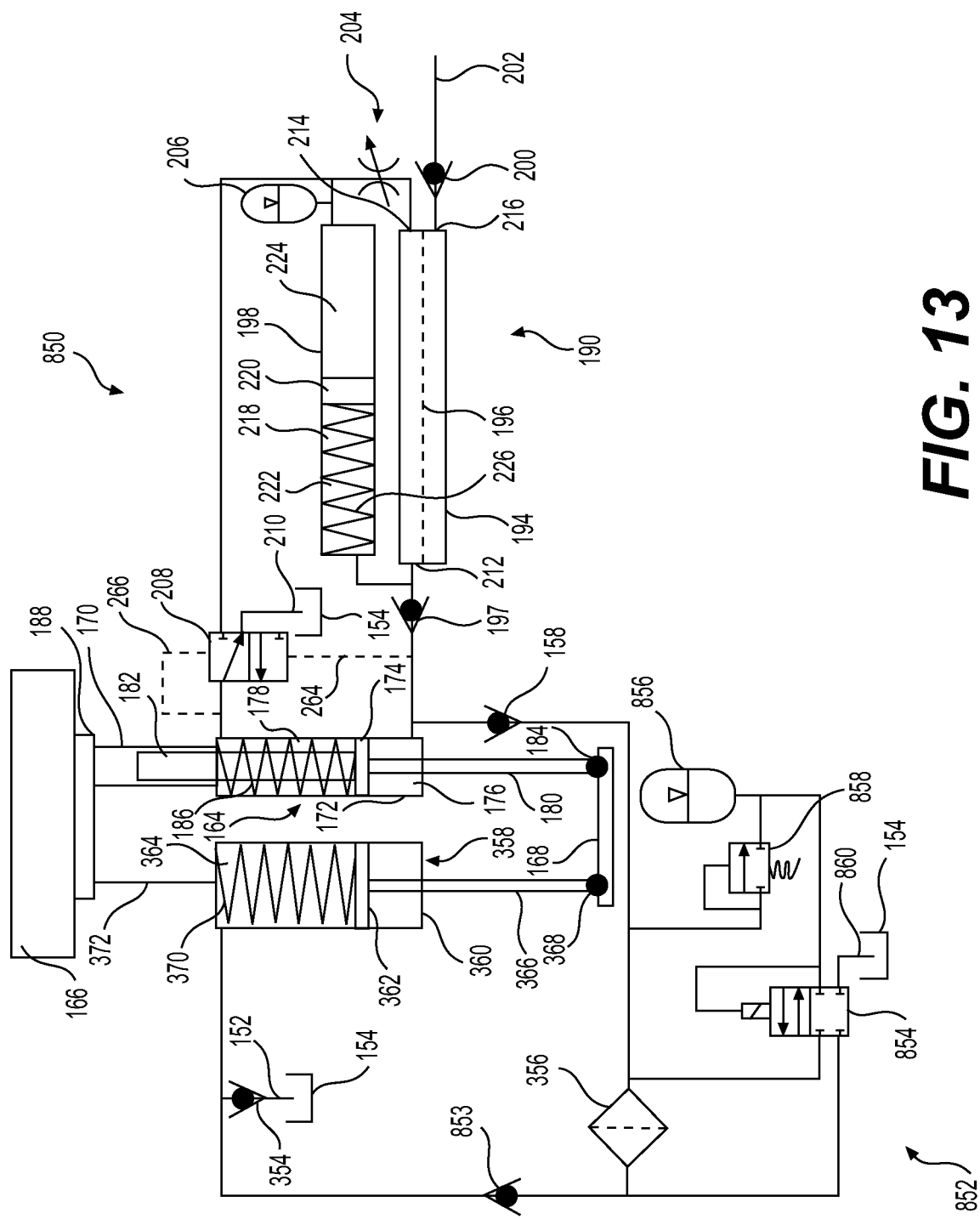
FIG. 13 is a schematic illustration of another alternative embodiment of the wave-actuated system of FIG. 8 during a downward stroke.

Turning now to FIG. 13, a wave-actuated system 850 for desalination of water by reverse osmosis will be described. The system 850 is similar to the system 350 described above with respect to FIG. 8 except that the pre-filter subsystem 352 has been replaced with a pre-filter subsystem 852.

The pre-filter subsystem 852 has the one-way valve 354, the pre-filters 356, the one-way valve 158, a one-way valve 853, a low pressure directional valve 854, an accumulator 856, a relief valve 858 and a backwash discharge 860. The one-way valve 853 is connected between the one-way valve 354 and the pre-filters 356. The relief valve 858 is connected to the line extending from the pre-filters 356 to the one-way valve 158. The accumulator 856 is connected between the relief valve 858 and the directional valve 854. The directional valve 854 is also connected to both sides of the pre-filters 356 and to the backwash discharge 860. The directional valve 854 is a four-way, two-position valve. The directional valve 854 has a first position (shown in FIG. 13) that prevents any flow through the directional valve 854. The directional valve 854 has a second position that hydraulically communicates the accumulator 856 with the pre-filters 356 and hydraulically communicates the pre-filters 356 with the backwash discharge 860 to permit backwashing of the pre-filters 356 as discussed below.

During normal operation, the directional valve 654 is in the first position. During the downward stroke, the one-way valve 152 is closed and the one-way valves 853, 158 are opened. Seawater is pushed out of the chamber 364 and flows into the lower chamber 176 via the one-way valves 853, 158. Some of the seawater pushed out of the chamber 364 also flows into the accumulator 856. To compensate for the amount of seawater being diverted to the accumulator 856, the piston 362 and the cylinder body 360 have a larger diameter than in the system 350 for the same hydraulic cylinder 164. The relief valve 858 opens and closes depending on the hydraulic pressures on each side thereof to ensure sufficient flow of seawater to the lower chamber 176.

When the accumulator 856 if full or has reached a predetermined pressure, the directional valve 854 is moved to its second position. As a result, seawater flows out of the accumulator 856, flows through the directional valve 854, then flows through the pre-filters 356 (from right to left with reference to FIG. 13), thereby backwashing them, and then flows out of the system 850 by the backwash discharge 860. Once the accumulator 856 is empty or is below a predetermined pressure, the directional valve 854 is returned to its first position. As the seawater in the accumulator 856 was filtered by the pre-filters 356, it does not contain particles that could be harmful for the pre-filters 356 when it is used to backwash the pre-filters 356. By backwashing the pre-filters 356, it is believed that the life of the pre-filters 356 can be increased and that the time between manual maintenance cycles of the pre-filters 356 can be increased. It is contemplated that the directional valve 854 could be actuated by one or more hydraulic pilots or by an electrically controlled actuator such as a solenoid.

Figure 14:
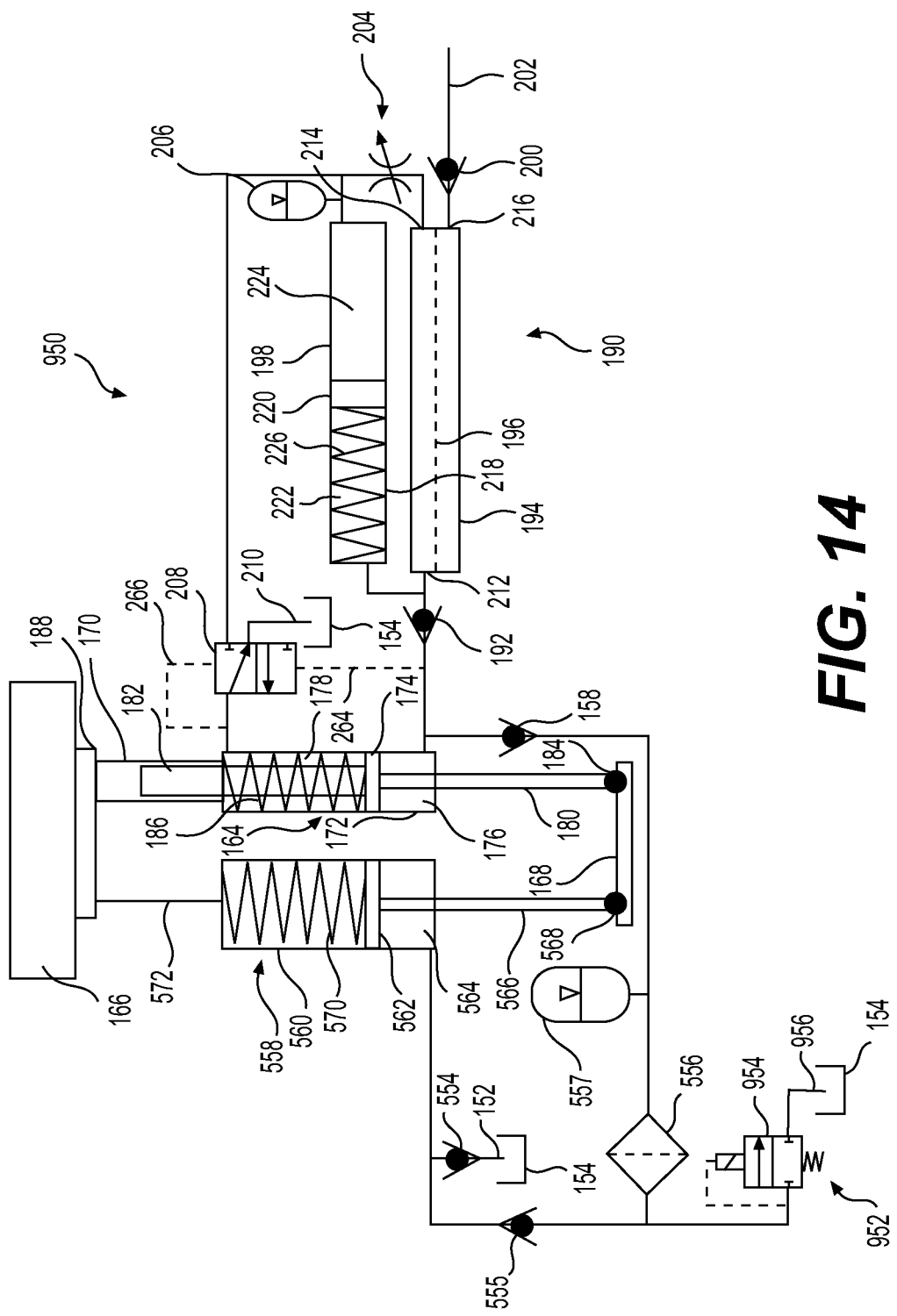
FIG. 14 is a schematic illustration of another alternative embodiment of the wave-actuated system of FIG. 8 during a downward stroke.

Turning now to FIG. 14, a wave-actuated system 950 for desalination of water by reverse osmosis will be described. The system 950 is similar to the system 550 described above with respect to FIG. 10 except that the pre-filter subsystem 552 has been replaced by a pre-filter subsystem 952.

The pre-filter subsystem 952 has the one-way valve 554, the positive pressure pre-filters 556, the low pressure hydraulic cylinder 558, the one-way valve 555, the hydraulic cylinder 558, the one-way valve 158, the accumulator 557, a directional valve 954 and a backwash discharge 956. The directional valve 954 is connected between the one-way valve 558 and the pre-filters 556. The directional valve 954 is a two-way, two position valve. The backwash discharge 956 is downstream of the valve 954.

The directional valve 954 has a first position (shown in FIG. 14) that prevents flow to the backwash discharge 956. The directional valve 954 has a second position that hydraulically communicates the accumulator 557 and the pre-filters 556 with the backwash discharge 956 to permit backwashing of the pre-filters 556 as discussed below.

During normal operation, the directional valve 954 is in the first position. During the upward stroke, the one-way valve 555 is open and the one-way valves 554, 158 are closed. The seawater inside the chamber 564 is pushed out of the chamber 564 and then flows through the one-way valve 555, through the pre-filters 556 and the one-way valve 158 and then flows into the accumulator 557, thereby increasing the pressure inside the accumulator 557. In order to build up seawater and pressure inside the accumulator 557 such that water in the accumulator 557 can be used to backwash the pre-filters 556, the annular area between the piston 562 and the cylinder body 560 is larger than in the system 550 for the same hydraulic cylinder 164.

During the downward stroke, the one-way valve 555 is closed and the one-way valves 554, 158 are opened. Seawater is sucked into the chamber 564 from the seawater intake 152 via the one-way valve 554. Some of the seawater that has accumulated inside the accumulator 557 flows out of the accumulator 557, flows through the one-way valve 158 and then flows into the lower chamber 176 of the hydraulic cylinder 164. The pressure of the seawater flowing inside the lower chamber 176 applies a restoring force that assists in moving the cylinder body 172 downward relative to the piston 174. As such, it is contemplated that the spring 186 could be omitted.

When the accumulator 557 if full or has reached a predetermined pressure, the directional valve 954 is moved to its second position. As a result, seawater flows out of the accumulator 557, flows through the directional valve 954, then flows through the pre-filters 556 (from right to left with reference to FIG. 14), thereby backwashing them, and then flows out of the system 950 by the backwash discharge 956. Once the accumulator 557 is empty or is below a predetermined pressure, the directional valve 954 is returned to its first position. As the seawater in the accumulator 557 was filtered by the pre-filters 556, it does not contain particles that could be harmful for the pre-filters 556 when it is used to backwash the pre-filters 556. By backwashing the pre-filters 556, it is believed that the life of the pre-filters 556 can be increased and that the time between manual maintenance cycles of the pre-filters 556 can be increased. It is contemplated that the directional valve 954 could be actuated by one or more hydraulic pilots or by an electrically controlled actuator such as a solenoid.

Figure 15:
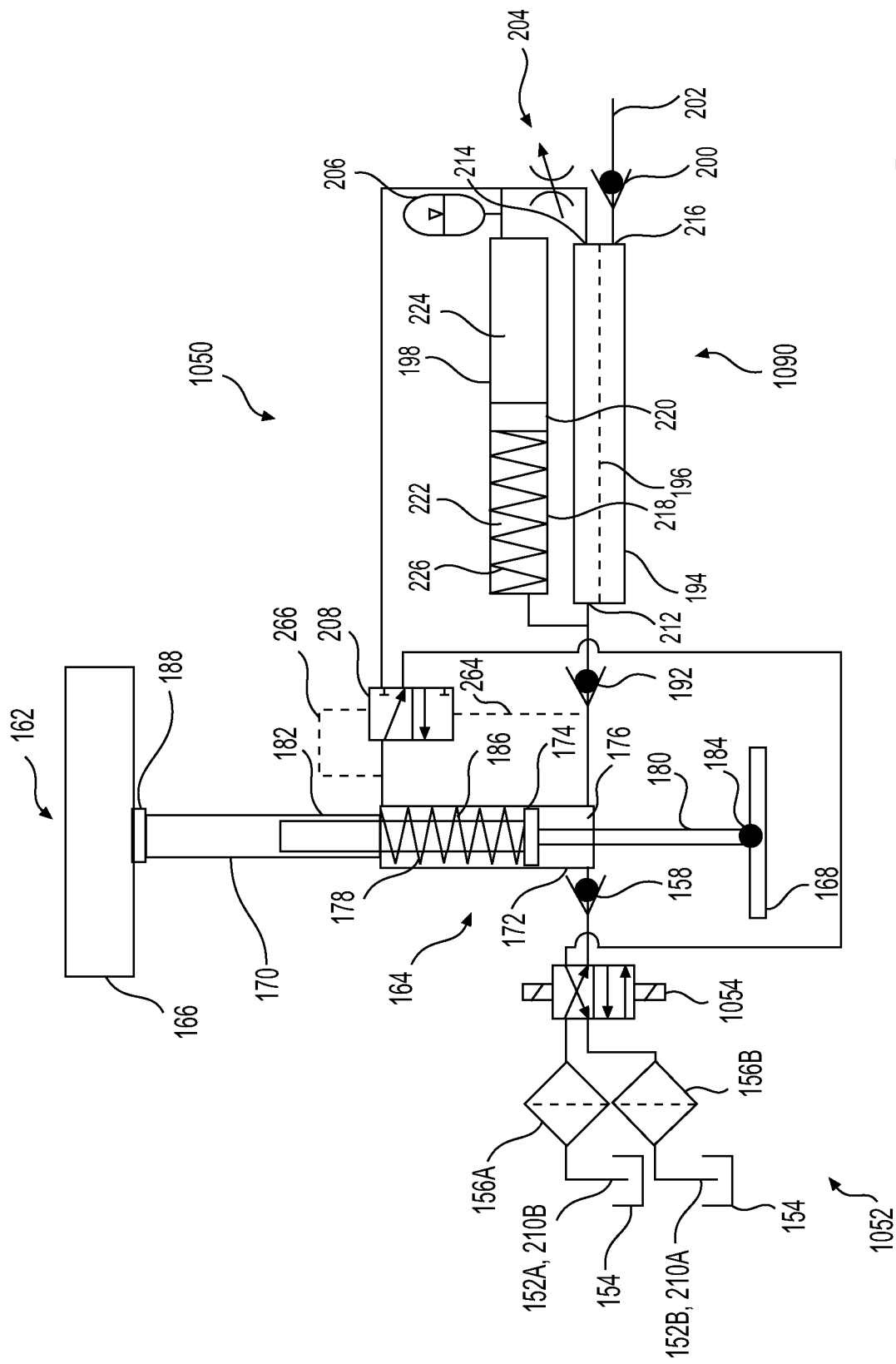
FIG. 15 is a schematic illustration of another alternative embodiment of the wave-actuated system of FIG. 6A during a downward stroke.

Turning now to FIG. 15, a wave-actuated system 1050 for desalination of water by reverse osmosis will be described. The system 1050 is similar to the system 150 described above with respect to FIGS. 6A and 6B except that the pre-filter subsystem 161 has been replaced with a pre-filter subsystem 1052.

The pre-filter 1052 has two sets of pre-filters 156, namely pre-filters 156A and 156B, a directional valve 1054 and the one-way valve 158. The directional valve 1054 is a four-way, two position valve. Depending on the position of the directional valve 1054, the connection between the pre-filters 156A, 156B and the sea act as a seawater intake 152 or as a brine discharge.

When the directional valve 1054 is in a first position (shown in FIG. 15), during the upward stroke, seawater enters the system 1050 by the seawater intake 152A, flows through the pre-filter 156A, the directional valve 1054, the one-way valve 158 and into the lower chamber 176. During the downward stroke, brine flows from the upper chamber 178, the three-way valve 208, the directional valve 1054, the pre-filters 156B, thereby backwashing them, and out of the system by the brine discharge 210A.

When the directional valve 1054 is in a second position, during the upward stroke seawater, enters the system 1050 by the seawater intake 152B, flows through the pre-filter 156B, the directional valve 1054, the one-way valve 158 and into the lower chamber 176. During the downward stroke, brine flows from the upper chamber 178, the three-way valve 208, the directional valve 1054, the pre-filters 156A, thereby backwashing them, and out of the system by the brine discharge 210B.

It is contemplated that the directional valve 1054 could be actuated by one or more hydraulic pilots or by an electrically controlled actuator such as a solenoid. It is also contemplated that the directional valve 1054 could be hydraulically or electrically controlled by a timer or based on the pressure differential across the pre-filters 156A, 156B. A high pressure differential across the pre-filters 156A or 156B generally indicates that they are clogged and that they need to be backwashed.

Figure 16:
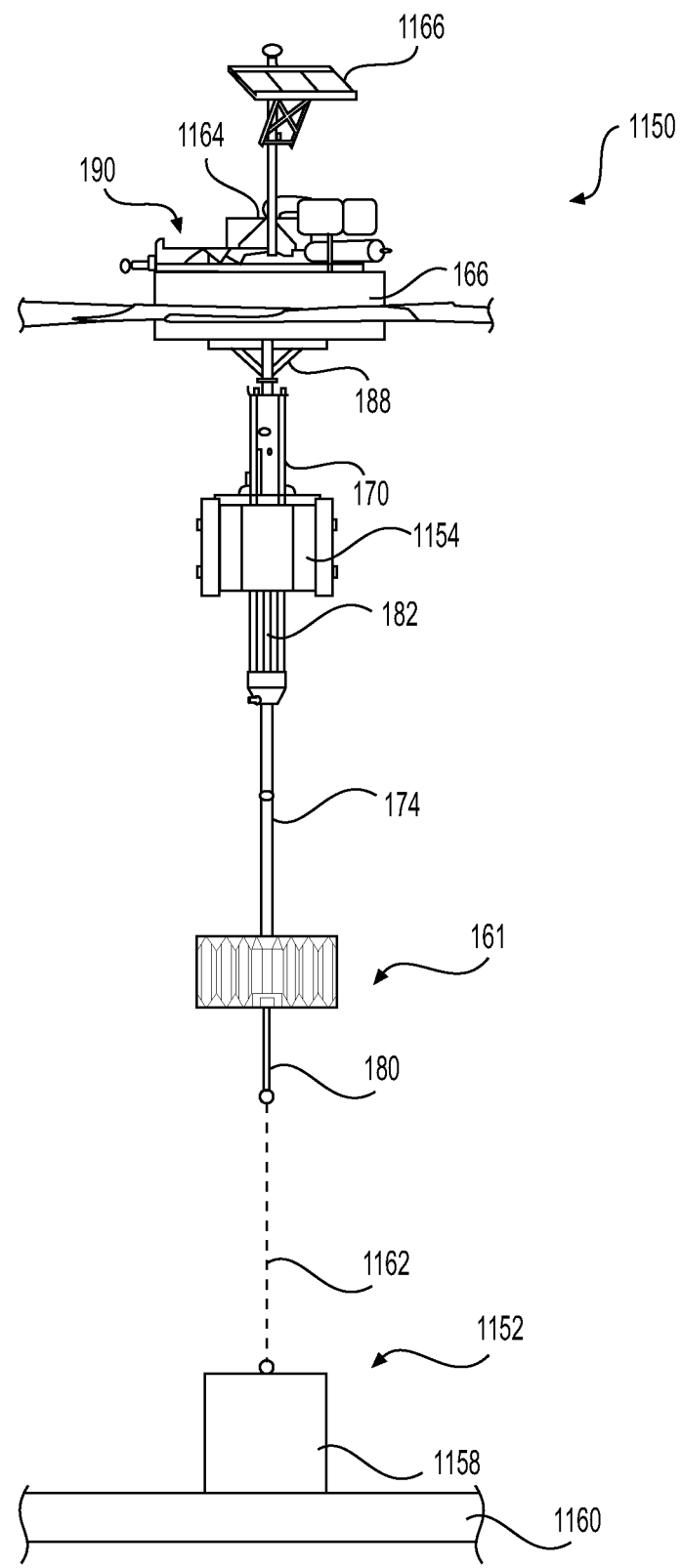
FIG. 16 is a side elevation of another alternative embodiment of the wave-actuated system of FIG. 6A during a downward stroke.
Figure 17:
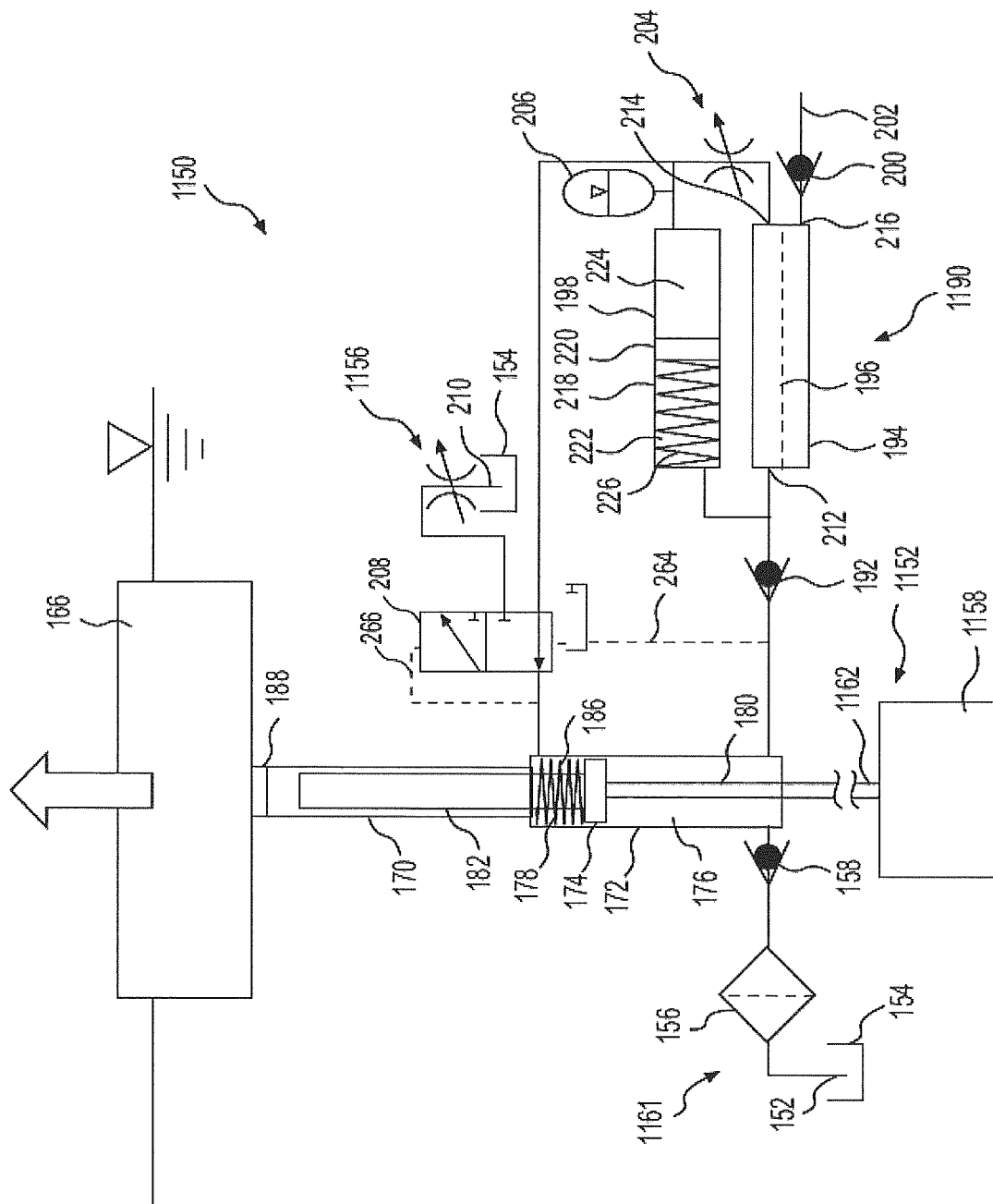
FIG. 17 is a schematic illustration of the wave-actuated system of FIG. 16 during an upward stroke.

Turning now to FIGS. 16 and 17, a wave-actuated system 1150 for desalination of water by reverse osmosis will be described. The system 1150 is similar to the system 150 described above except that the drag plate 168 has been replaced by deadweight assembly 1152, which is the reaction member in this embodiment, a float 1154 (FIG. 16) is connected to the upper rod 182 and a restriction 1156 (FIG. 17) has been added between the three-way valve 208 and the brine discharge 210. Also, the accumulator 160 has been omitted, but it is contemplated that it could be provided. The system 1150 operates in the same manner as the system 150 described above, except that it is the deadweight assembly 1152 and the float 1154 that help maintain the piston 174 and the rods 180, 182 in position while the cylinder body 172 moves up and down with the float 166. It is contemplated that the spring 186 could be omitted and that the weight of the float 166, the cylinder body 172, the frame 170 and the connector 188 cause these elements to move down relative to the piston 174 and the rods 180, 182 as the float 166 move down while the float 1154 and deadweight assembly 1152 maintain the piston 174 and the rods 180, 182 in position. It is also contemplated that the float 1154 could be provided in the other systems described above. It is also contemplated that the drag plate 168 in the above embodiments could be replaced by the deadweight assembly 1152. In some embodiments, the hydraulic cylinder 164 of the system 1150 provides a longer stroke than the other embodiments having the drag plate 168 in order to account for the varying sea level resulting from tides.

As can be seen in FIG. 16, the deadweight assembly 1152 includes a deadweight, in this case a concrete block 1158, that rest on the sea bed 1160 and a chain 1162 that connects the concrete block 1158 to the lower end of the lower rod 180. Other types of deadweights are contemplated. It is also contemplated that the chain 1162 could be replaced by another type of connecting element such as a rope. The pre-filter subsystem 161 is mounted to the cylinder body 174 and moves with it. The RO desalination subsystem 190 is mounted on top of the float 166, thus facilitating its maintenance. As can also be seen in FIG. 16, a winch 1164 is provided on top of the float 166 to help during the installation and removal of the system 1150 as will be described below with respect to another embodiment. A solar panel 1166 is also provided on the float 166. The solar panel 1166 recharges one or more batteries (not shown) used to power various sensors and gauges (not shown) provided in the system 1150. The batteries can also power valve actuators should the pre-filter subsystem 161 be replaced by one of the pre-filter subsystems described above that provide a backwashing feature and that have a valve that is to be actuated. It is also contemplated that the batteries could be used to power communication equipment used to transmit data obtained from the sensors to a base station on-shore and/or to receive commands to actuate the aforementioned valves.

Although not described in detail herein, it is contemplated that other combinations of the pre-filter subsystems, the WEC subsystems and the RO desalination subsystems of the systems 150, 270, 350, 450, 550, 650, 750, 850, 950, 1050 and 1150 are possible. For example, it is contemplated that the pre-filter subsystem 352 of the system 450 could be replace with the pre-filter subsystem 852 to permit backwashing of the pre-filters 356.

During a certain percentage of sea states for a specific site, the wave-actuated systems described above may not be able to convert enough energy from the waves to supply seawater to the RO cell at a high enough pressure for the RO membrane to function effectively. During this time, seawater can still be transformed in permeate but it will be at a high salinity (brackish). As such, it is contemplated that a diverting valve could be provided downstream of the permeate exhaust port to waste this brackish water in the sea. In one embodiment, the diverting valve has two positions and is piloted by the water pressure in the RO desalination subsystem.

Turning now to FIGS. 18 to 21 various physical arrangements and other features of the system 150 described above will be described. It should be understood that similar physical arrangements and features could apply to the other systems described above.

Figure 18:
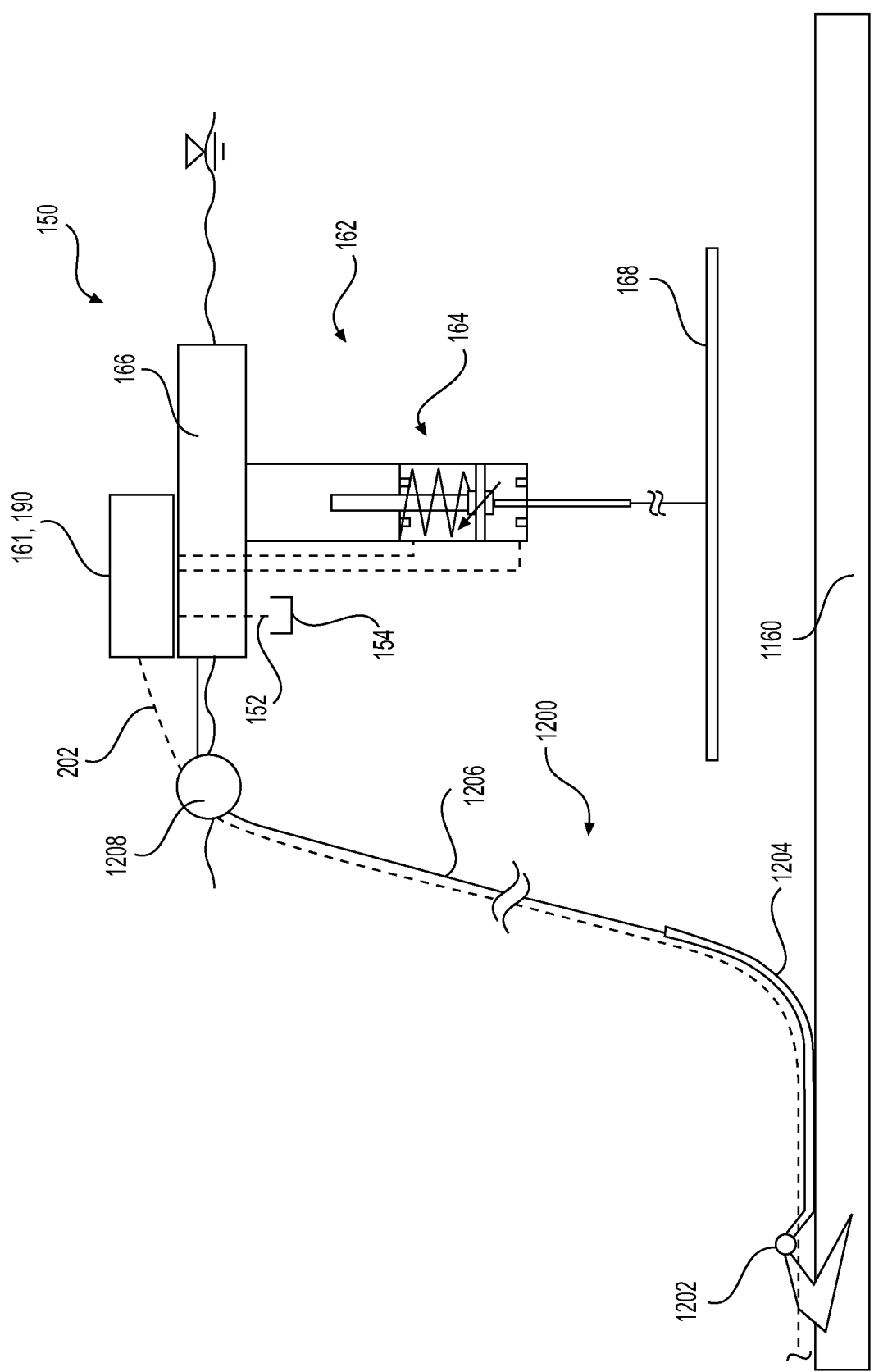
FIG. 18 is a schematic side elevation view of the wave-actuated system of FIG. 6A as installed in the sea.

In an embodiment of the system 150 shown in FIG. 18, the pre-filter subsystem 161 and the RO desalination subsystem 190 are provided on top of the float 166. The system 150 is anchored to the seabed 1160 by an anchoring system 1200. In the embodiment shown, the anchoring system 1200 is a three-point catenary anchoring system having a drag anchor 1202, a chain 1204, ropes 1206 (only one of which is shown) and a small float 1208. This type of anchoring system 1200 has the advantage that it can be installed without the use of heavy duty marine equipment as it is lightweight compared to deadweight anchors. Also, the anchoring system 1200 can be installed from the surface, without the need of divers. The float 1208 is used to prevent the ropes 1206 to roll around components of the system 150. The float 1208 also holds the weights of the chain 1204 and the ropes 1206 which are suspended above the seabed 1160. The permeate pipeline 202 runs from the RO desalination subsystem 190 to the float 1208 and then runs close to one of the ropes 1206 to the seabed 1160. The permeate pipeline 202 then runs to where the permeate is to be used such as to shore or to a platform at sea for example. It is contemplated that other types of anchoring systems could be used. For example, a single point deadweight anchor could be attached to the drag plate 168.

Figure 19A:
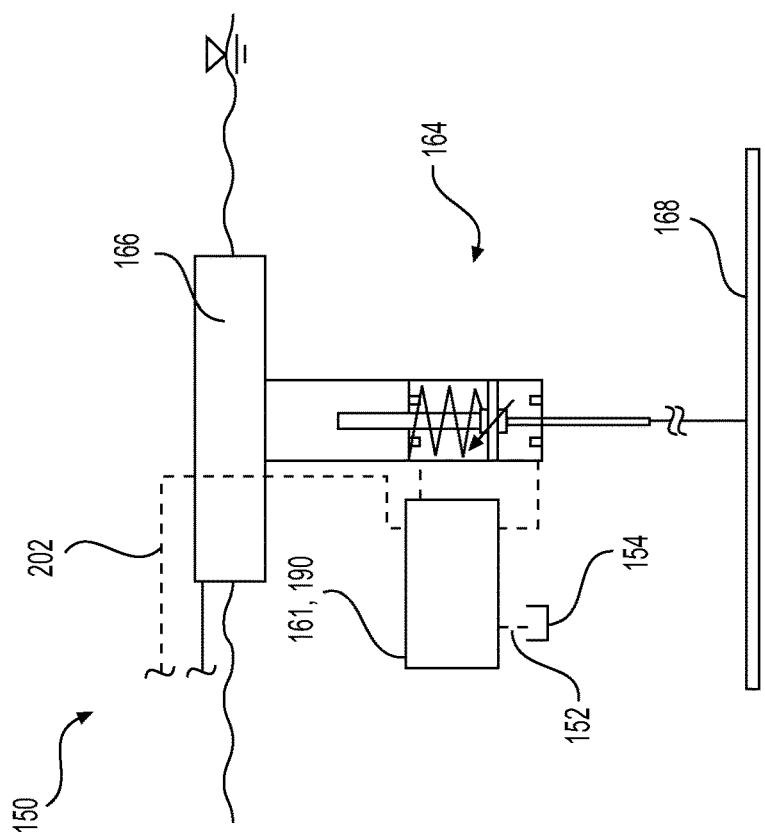
FIGS. 19A to 19C are schematic side elevation views of various alternative arrangements of the subsystems of the wave-actuated system of FIG. 6A.
Figure 19B:
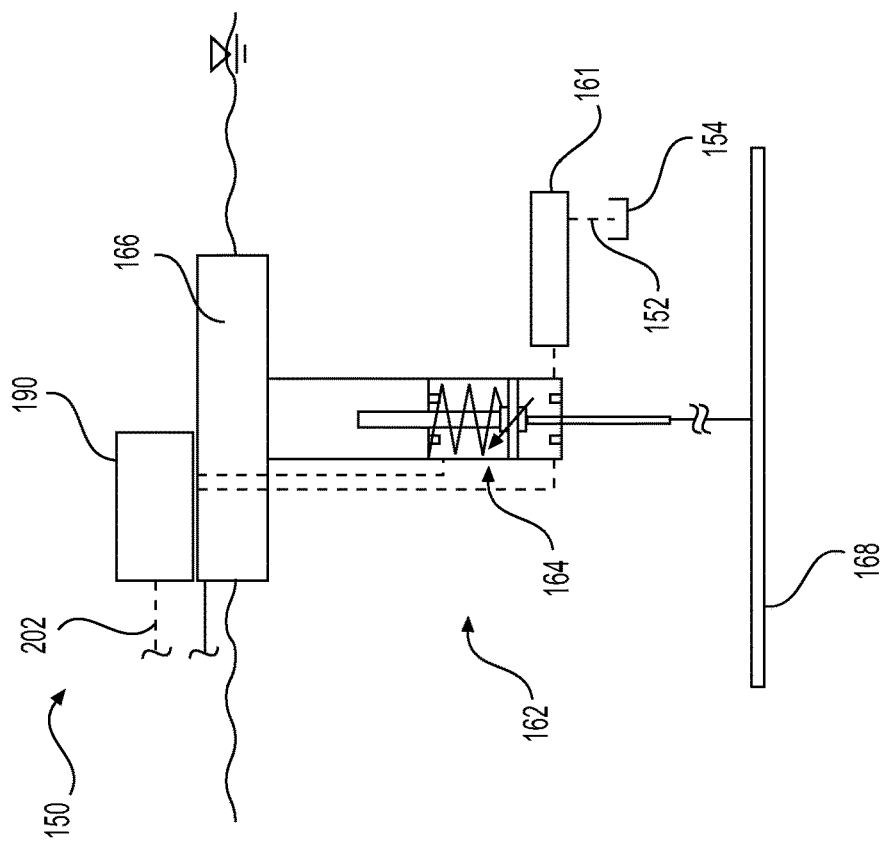
Figure 19C:
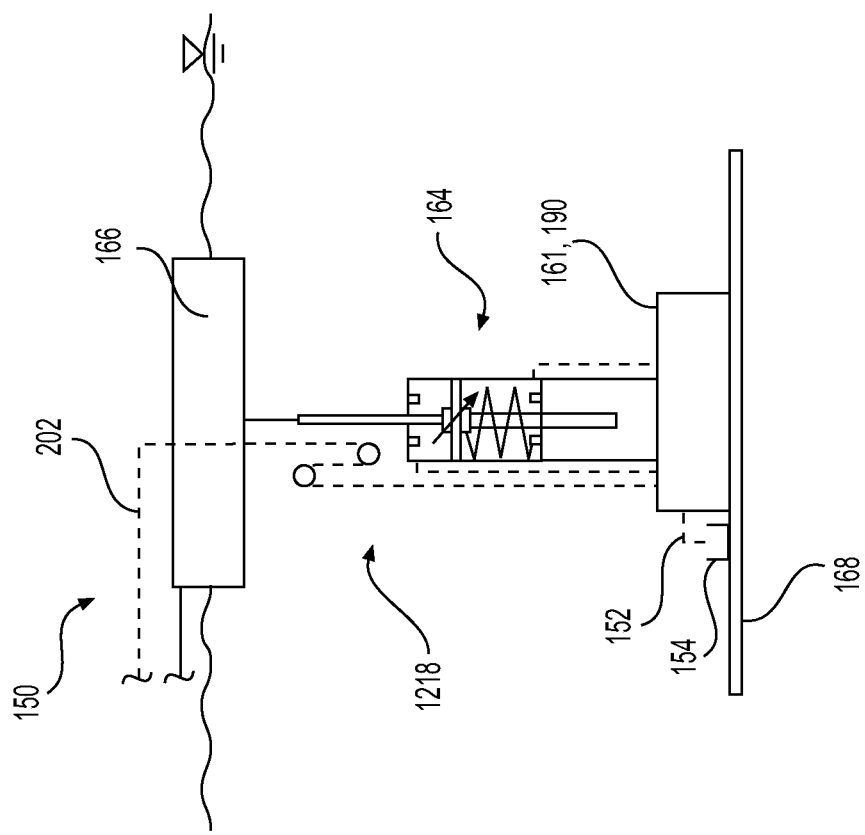

FIGS. 19A to 19C illustrate three other contemplated arrangements of the subsystems 161, 162 and 190 of the system 150.

In the embodiment of FIG. 19A, the RO desalination subsystem 190 is fixed on the float 166. The pre-filter subsystem 161 is fixed on the hydraulic cylinder 164.

In the embodiment of FIG. 19B, the RO desalination subsystem 190 and the pre-filter subsystem 161 are submerged. They are fixed to and hydraulically connected on the hydraulic cylinder 164.

In the embodiment shown FIG. 19C, the RO desalination subsystem 190 and pre-filter subsystem 161 are submerged. They are fixed to the drag plate 168. Since there is relative motion between the drag plate 168 and the float 166, a lazy wave system 1210 is provided so the permeate pipeline 202 is not stretched and broken.

FIGS. 20A and 20B illustrate two steps of one possible method of installing and removing the wave-actuated system 150 arranged as shown in FIG. 19C. A similar method can be used for the arrangements of FIGS. 19A and 19B and for the other wave-actuated systems described above.

With reference to FIGS. 20A and 20B, a tower 1220 is fixed on the float 166. The tower 1220 holds a winch 1222 above the float 166. The float 166 in this embodiment is generally toroidal in shape. As such, the float 166 defines a central aperture 1224. The winch 1222 can hoist the hydraulic cylinder 164, the pre-filter subsystem 161 and the RO desalination subsystem 190 through the aperture 1224 until the drag plate 168 abuts the bottom of the float 166 as shown in FIG. 20A. This compact arrangement allows the system 150 to be easily towed by a watercraft by connecting a rope or chain 1226 between the float 166 and the watercraft. Also, as the pre-filter subsystem 161 and the RO desalination subsystem 190 are located inside the aperture 1224 in the float 166 during displacement, the float 166 protects the pre-filter subsystem 161 and the RO desalination subsystem 190 from damage. The drag plate 168 defines a flat surface that facilitates dragging the system 150 on the beach when the system 150 is pushed from or returned to the shore. It is contemplated that components could be added to the drag plate 168 to reduce friction during towing and/or improve the hydrodynamic properties of the system when arranged as shown in FIG. 20A.

When the desired location is reached, the system 150 is anchored using the anchoring system 1200 (FIG. 18). The winch 1222 then lowers the hydraulic cylinder 164, the pre-filter subsystem 161 and the RO desalination subsystem 190 into the water as shown in FIG. 20B. The mechanical connections between the hydraulic cylinder 164 and the float are then made. Finally, the permeate pipeline 202 (FIG. 19C) is connected to the RO desalination subsystem 190.

To move the system 150 to a different location or to return it to shore, the above steps are repeated in the reverse order.

The above describes one method of installing and removing the wave-actuated system 150. Other methods as also contemplated.

The harsh sea conditions that exist during storms can damage the components of the system 150. The method described below helps improve the survivability of the system 150 in the arrangement shown in FIGS. 19C to 20B during such harsh conditions. A similar method can be used for the arrangements of FIGS. 19A and 19B and for the other wave-actuated systems described above.

The system of FIG. 19C reduces the loads on the RO WEC during intense wave action such as storms and hurricanes. This "survival" mode could be triggered by the user by a couple operations offshore. The storm has to be predicted in many cases to let the user do these operations in a safe way without big motions of the RO WEC components. It could also be triggered by an automated system with sensors. The trigger event could be based on a sensor signal that transmits the mooring loads, system pressure and/or wave height.

The first phase is winching up the lower components so that they touch the float. That way it forms a "block" where all the subsystems are close together (as shown in FIG. 20A in the installation mode).

The first step consists in hoisting the hydraulic cylinder 164, the pre-filter subsystem 161 and the RO desalination subsystem 190 through the aperture 1224 as shown in FIG. 20B using the winch 1222. This compact arrangement already lowers the load on the mechanical elements. It is contemplated that during less violent weather conditions, this step alone may be sufficient to improve the survivability to of the system 150. The anchoring system 1200 still retains lots of load from high wave action however.

It is contemplated that the winch 1222 can be operated autonomously by an energy storage devices, actuator and controls. To control the winch 1222 autonomously, it is contemplated that energy could be stored in one or more batteries recharged by a solar panel, such as the solar panel 1166 (FIG. 16), and then supplied to a winch actuator (not shown) or could be supplied to the winch actuator directly from the solar panel. A programmable logic controller could be used to actuate low power systems such as valves and relays. The same kind of control of the winch 1222 could be achieved with hydraulic or pneumatic logic circuitry.

It is contemplated that the winch 1222 could be actuated manually by a human operator, electronically (i.e. motor and batteries), pneumatically (i.e. pressurized gas reservoir and pneumatic motor) or hydraulically (i.e. pressurized fluid inside a gas filled accumulator and a hydraulic motor).

It is also contemplated that hydraulic actuation of the winch 1222 could be integrated with the RO desalination subsystem 190 that already contains pressurized water. To achieve this, an additional hydraulic accumulator could be provided to store pressurized water. This accumulator's water is then used to power a hydraulic motor that is connected to the winch 1222.

Figure 21:
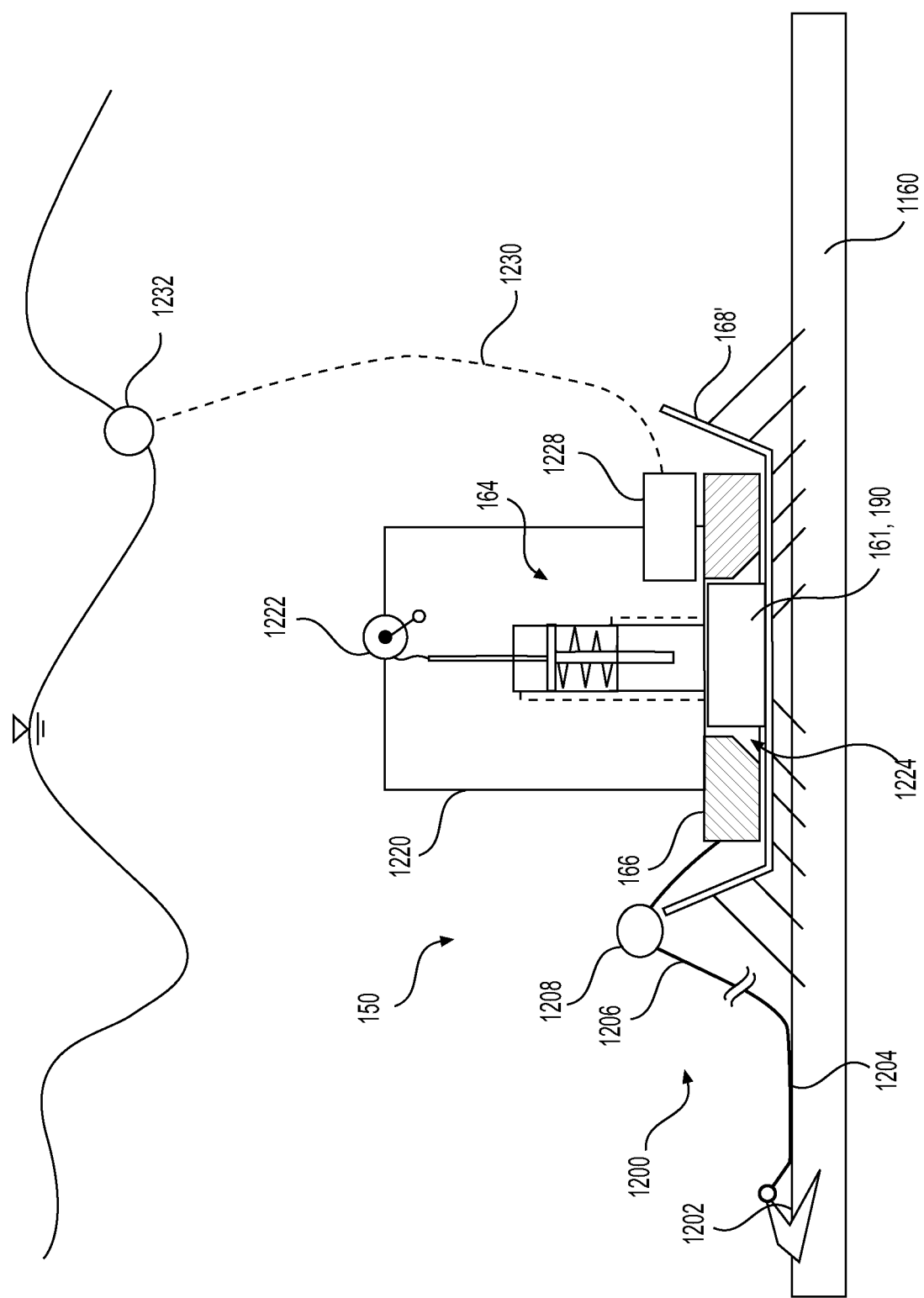
FIG. 21 illustrates the arrangement of the wave-actuated system of FIG. 19C sunk to the sea bed for protection of the wave-actuated system during a storm.

The second step consists in sinking the system arranged as shown in FIG. 20A to the seabed 1160 as shown in FIG. 21, or at least submerge it. This can be achieved by reducing the buoyancy of the float 166. In one embodiment, the float 166 is an inflatable float. The buoyancy of such a float 166 can be reduced by releasing at least some of the gas contained in the float 166. In another embodiment, the float 166 has ballasts that can be filled with water to reduce the buoyancy of the float 166. In one embodiment shown in FIG. 21, the drag plate 168 is replaced by a drag plate 168' having an upwardly bent contour that protects the sides of the system 150 from impact should the system 150 not sink straight down and/or should the seabed 1160 not be level. The raised contour of the drag plate 168' also protects the sides of the system 150 should the system move along the seabed 1160 during the storm.

The third step consists in maintaining the system 150 as stationary as possible on the seabed 1160 for the duration of the storm. In one embodiment, the ropes 1206 of the anchoring system 1200 are elastic, thereby applying a tension between the system 150 and the anchor 1202 that helps maintain the system 150 in place. In another embodiment, one or more winches are used to wind the ropes to maintain a tension between the system 150 and the anchor 1202 that helps maintain the system 150 in place. It is also contemplate the other components could be added.

Once the storm is over, the system 150 is brought back to the surface while still in its compact arrangement (FIG. 19C). In an embodiment shown in FIG. 21, a pneumatic system 1228 is provided on the float 166. In one embodiment, the pneumatic system 1228 has a gas reservoir used to inflate the float or empty the ballasts, depending on the embodiment of the float 166, to increase the buoyancy of the float 166. In another embodiment, a snorkeling line 1230 that opens above the sea surface by having its end connected to a small float 1232 is connected to an air compressor of the pneumatic system 1228. The air compressor sucks in air through the snorkeling line 1230 and supplies it to the float 166 to inflate it or to empty the ballasts, depending on the embodiment of the float 166, to increase the buoyancy of the float 166. In another embodiment, the snorkeling line 1230 is connected to the inside of the float 166 or to its ballasts, depending on the embodiment of the float. To increase the buoyancy of the float 166, a human operator connects an air compressor to the end of the snorkeling line 1232 and the air compressor supplies air via the snorkeling line 1232 to the float 166 to inflate it or to empty the ballasts, depending on the embodiment of the float 166.

Once the system 150 is returned to the surface of the water, the winch 1222 lowers the hydraulic cylinder 164, the pre-filter subsystem 161, the RO desalination subsystem 190 and the drag plate 168 back in their operational position (FIG. 20B).

Embodiments of the present technology can be represented as presented in the following numbered clauses.

CLAUSE 1. A wave-actuated system for desalination of water by reverse osmosis (RO) comprising: a wave energy converter (WEC) subsystem comprising: a float; a reaction member; and a hydraulic cylinder comprising: a cylinder body; and a piston slidably received in the cylinder body, one of the cylinder body and the piston being connected to the float, another one of the cylinder body and the piston being connected to the reaction member, the piston and the cylinder body defining a first variable volume chamber on a first side of the piston and a second variable volume chamber on a second side of the piston, the second side being opposite the first side, the first variable volume chamber being selectively hydraulically connected to a seawater intake; and a RO desalination subsystem comprising: a RO cell having a seawater inlet port, a brine exhaust port and a permeate exhaust port, the seawater inlet port being selectively hydraulically connected to the first variable volume chamber, the brine exhaust port being hydraulically connected to a brine discharge, the permeate exhaust port being hydraulically connected to a permeate discharge; a RO membrane disposed in the RO cell; and a flow smoothing device (FSD) being selectively hydraulically connected to the first variable volume chamber and being hydraulically connected to the seawater inlet port; during a first stroke of the WEC subsystem: the float moving in a first direction; the one of the cylinder body and the piston being connected to the float moving in the first direction relative to the other of the cylinder body and the piston; seawater being supplied from the first variable volume chamber to the RO cell via the seawater inlet port; and seawater being supplied from the first variable volume chamber to the FSD; during a second stroke of the WEC subsystem: the float moving in a second direction opposite the first direction; the one of the cylinder body and the piston being connected to the float moving in the second direction relative to the other of the cylinder body and the piston; seawater being supplied from the seawater intake to the first variable volume chamber; and seawater being supplied from the FSD to the RO cell via the seawater inlet port.

CLAUSE 2. The wave-actuated system of CLAUSE 1, further comprising at least one valve; and wherein: the at least one valve selectively hydraulically connects the brine exhaust port with the second variable volume chamber; the at least one valve selectively hydraulically connects the second variable volume chamber with the brine discharge; during the first stroke, the at least one valve hydraulically connects the brine exhaust port with the second variable volume chamber to supply brine from the brine exhaust port to the second variable volume chamber; and during the second stroke, the at least one valve hydraulically connects the second variable volume chamber with the brine discharge to supply brine from the second variable volume chamber to the brine discharge.

CLAUSE 3. The wave-actuated system of CLAUSE 2, wherein the at least one valve is a three-way valve having a first flow port hydraulically connected to the brine exhaust port, a second flow port hydraulically connected to the brine discharge, and a third flow port hydraulically connected to the second variable volume chamber.

CLAUSE 4 The wave-actuated system of CLAUSE 2 or 3, wherein the hydraulic cylinder further comprises: a first rod connected to the piston, the first rod being connected to the one of the float and the reaction member that is connected to the piston, the first rod extending in the first variable volume chamber; and a second rod connected to the piston and extending in the second variable volume chamber, the second rod having a larger diameter than the first rod.

CLAUSE 5. The wave-actuated system of any one of CLAUSES 1 to 4, wherein the hydraulic cylinder further comprises a spring disposed in one of the first and second variable volume chambers.

CLAUSE 6. The wave-actuated system of any one of CLAUSES 1 to 5, wherein: the float is a first float; and the WEC subsystem further comprises a second float connected to the one of the cylinder body and the piston being connected to the reaction member.

CLAUSE 7. The wave-actuated system of any one of CLAUSES 1 to 6, wherein the reaction member is a drag plate.

CLAUSE 8. The wave-actuated system of any one of CLAUSES 1 to 6, wherein the reaction member is a deadweight assembly.

CLAUSE 9. The wave-actuated system of any one of CLAUSES 1 to 8, wherein the RO desalination subsystem further comprises a pressure smoothing device (PSD) hydraulically connected between the brine exhaust port and the brine discharge; and wherein the PSD accumulates brine during the first stroke and releases brine during the second stroke.

CLAUSE 10. The wave-actuated system of claim of CLAUSE 9, wherein the PSD is an accumulator.

CLAUSE 11. The wave-actuated system of any one of CLAUSES 1 to 10, wherein: the hydraulic cylinder is a first hydraulic cylinder; the cylinder body is a first cylinder body; the piston is a first piston; and the FSD comprises: a second hydraulic cylinder having a second cylinder body and a second piston slidably received in the second cylinder body, the second piston and the second cylinder body defining a third variable volume chamber on a first side of the second piston and a fourth variable volume chamber on a second side of the second piston, the second side being opposite the first side, the third variable volume chamber being selectively hydraulically connected to the first variable volume chamber and hydraulically connected to the seawater inlet port, and the fourth variable volume chamber being hydraulically connected to the brine exhaust port, during the first stroke, seawater being supplied from the first variable volume chamber to the third variable volume chamber, and during the second stroke, seawater being supplied from the third variable volume chamber to the RO cell via the seawater inlet port.

CLAUSE 12. The wave-actuated system of CLAUSE 11, wherein the RO desalination subsystem further comprises a pressure smoothing device (PSD) hydraulically connected between the brine exhaust port and the fourth variable volume chamber; and wherein the PSD accumulates brine during the first stroke and supplies brine to the fourth chamber during the second stroke.

CLAUSE 13. The wave-actuated system of any one of CLAUSES 1 to 12, further comprising a pre-filter subsystem, the pre-filter subsystem comprising at least one pre-filter hydraulically connected between the seawater intake and the first variable volume chamber.

CLAUSE 14. The wave-actuated system of CLAUSE 13, further comprising a one-way valve hydraulically connected between the seawater intake and the first variable volume chamber; wherein: the one-way valve prevents flow of seawater from the seawater intake to the first variable chamber via the at least one pre-filter during the first stroke; and the one-way valve permits flow of seawater from the seawater intake to the first variable chamber via the at least one pre-filter during the second stroke.

CLAUSE 15. The wave-actuated system of CLAUSE 13 or 14, wherein: the hydraulic cylinder is a first hydraulic cylinder; the cylinder body is a first cylinder body; the piston is a first piston; and the pre-filter subsystem further comprises: a second hydraulic cylinder having a second cylinder body and a second piston slidably received in the second cylinder body, one of the second cylinder body and the second piston being connected to the float, another one of the second cylinder body and the second piston being connected to the reaction member, the second piston and the second cylinder body defining a third variable volume chamber, the third variable volume chamber being selectively hydraulically connected to seawater inlet, and the third variable volume chamber being hydraulically connected to the at least one pre-filter to supply seawater to the at least one pre-filter during one of the first and second strokes.

CLAUSE 16. The wave-actuated system of any one of CLAUSES 13 to 15, wherein: the pre-filter subsystem further comprises a valve selectively hydraulically communicating the at least one pre-filter with one of the second variable volume chamber, the permeate exhaust port and an accumulator; and when the valve opens, water flows from the one of the second variable volume chamber, the permeate exhaust port and the accumulator through the at least one pre-filter to backwash the at least one pre-filter.

CLAUSE 17. The wave actuated system of any one of CLAUSES 13 to 16, wherein the pre-filter subsystem further comprises an accumulator hydraulically connected between the at least one pre-filter and the first variable volume chamber.

CLAUSE 18. The wave actuated system of any one of CLAUSES 1 to 17, further comprising an accumulator selectively hydraulically connected to the first variable volume chamber; and herein the accumulator supplies water to the first variable volume chamber during the second stroke.

CLAUSE 19. The wave-actuated system of any one of CLAUSES 1 to 18, wherein: the cylinder body of the hydraulic cylinder of the WEC subsystem is connected to the float; the piston of the hydraulic cylinder of the WEC subsystem is connected to the reaction member; the first variable volume chamber is a lower chamber; the second variable volume chamber is an upper chamber; the first stroke is an upward stroke; the first direction is an upward direction; the second stroke is a downward stroke; and the second direction is a downward direction.

CLAUSE 20. A method for desalinating water by reverse osmosis using a wave-actuated system, the wave actuated system comprising a wave energy converter (WEC) subsystem and a reverse osmosis (RO) subsystem, the method comprising: during a first stroke of the WEC subsystem: supplying seawater from a first variable volume chamber of a hydraulic cylinder of the WEC subsystem to an RO cell of the RO subsystem via a seawater inlet port of the RO cell, the RO cell having a RO membrane contained therein; supplying seawater from the first variable volume chamber to a flow smoothing device (FSD) of the RO subsystem; supplying brine from a brine exhaust port of the RO cell; and supplying permeate from a permeate exhaust port of the RO cell; and during a second stroke of the WEC subsystem: supplying seawater from a seawater intake to the first variable volume chamber; supplying seawater from the FSD to the RO cell via the seawater inlet port; supplying brine from the brine exhaust port; and supplying permeate from the permeate exhaust port.

CLAUSE 21. The method of CLAUSE 20, wherein, during the first stroke, supplying brine from the brine exhaust port comprises supplying brine from the brine exhaust port to a second variable volume chamber of the hydraulic cylinder; and the method further comprises supplying brine from the second variable volume chamber to a brine discharge during the second stroke.

Modifications and improvements to the above-described embodiments of the present technology may become apparent to those skilled in the art. The foregoing description is intended to be exemplary rather than limiting. The scope of the present technology is therefore intended to be limited solely by the scope of the appended claims.

What is claimed is:

1. A wave-actuated system for desalination of water by reverse osmosis (RO) comprising:
    a wave energy converter (WEC) subsystem comprising:
        a float;
        a reaction member; and
        a hydraulic cylinder comprising:
            a cylinder body; and
            a piston slidably received in the cylinder body,
            one of the cylinder body and the piston being connected to the float,
            another one of the cylinder body and the piston being connected to the reaction member,
            the piston and the cylinder body defining a first variable volume chamber on a first side of the piston and a second variable volume chamber on a second side of the piston, the second side being opposite the first side,
            the first variable volume chamber being selectively hydraulically connected to a seawater intake; and
    a RO desalination subsystem comprising:
        a RO cell having a seawater inlet port, a brine exhaust port and a permeate exhaust port, the seawater inlet port being selectively hydraulically connected to the first variable volume chamber, the brine exhaust port being hydraulically connected to a brine discharge, the permeate exhaust port being hydraulically connected to a permeate discharge;
        a RO membrane disposed in the RO cell; and
        a flow smoothing device (FSD) being selectively hydraulically connected to the first variable volume chamber and being hydraulically connected to the seawater inlet port;
    during a first stroke of the WEC subsystem:
        the float moving in a first direction;
        the one of the cylinder body and the piston being connected to the float moving in the first direction relative to the other of the cylinder body and the piston;
        seawater being supplied from the first variable volume chamber to the RO cell via the seawater inlet port; and
        seawater being supplied from the first variable volume chamber to the FSD;
    during a second stroke of the WEC subsystem:
        the float moving in a second direction opposite the first direction;
        the one of the cylinder body and the piston being connected to the float moving in the second direction relative to the other of the cylinder body and the piston;
        seawater being supplied from the seawater intake to the first variable volume chamber; and
        seawater being supplied from the FSD to the RO cell via the seawater inlet port.

2. The wave-actuated system of claim 1, further comprising at least one valve; and
    wherein:
        the at least one valve selectively hydraulically connects the brine exhaust port with the second variable volume chamber;
        the at least one valve selectively hydraulically connects the second variable volume chamber with the brine discharge;
        during the first stroke, the at least one valve hydraulically connects the brine exhaust port with the second variable volume chamber to supply brine from the brine exhaust port to the second variable volume chamber; and during the second stroke, the at least one valve hydraulically connects the second variable volume chamber with the brine discharge to supply brine from the second variable volume chamber to the brine discharge.

3. The wave-actuated system of claim 2, wherein the at least one valve is a three-way valve having a first flow port hydraulically connected to the brine exhaust port, a second flow port hydraulically connected to the brine discharge, and a third flow port hydraulically connected to the second variable volume chamber.

4. The wave-actuated system of claim 2, wherein the hydraulic cylinder further comprises:
 a first rod connected to the piston, the first rod being connected to the one of the float and the reaction member that is connected to the piston, the first rod extending in the first variable volume chamber; and
 a second rod connected to the piston and extending in the second variable volume chamber, the second rod having a larger diameter than the first rod.

5. The wave-actuated system of claim 1, wherein the hydraulic cylinder further comprises a spring disposed in one of the first and second variable volume chambers.

6. The wave-actuated system of claim 1, wherein:
 the float is a first float; and
 the WEC subsystem further comprises a second float connected to the one of the cylinder body and the piston being connected to the reaction member.

7. The wave-actuated system of claim 1, wherein the reaction member is a drag plate.

8. The wave-actuated system of claim 1, wherein the reaction member is a deadweight assembly.

9. The wave-actuated system of claim 1, wherein the RO desalination subsystem further comprises a pressure smoothing device (PSD) hydraulically connected between the brine exhaust port and the brine discharge; and
 wherein the PSD accumulates brine during the first stroke and releases brine during the second stroke.

10. The wave-actuated system of claim of claim 9, wherein the PSD is an accumulator.

11. The wave-actuated system of claim 1, wherein:
 the hydraulic cylinder is a first hydraulic cylinder;
 the cylinder body is a first cylinder body;
 the piston is a first piston; and
 the FSD comprises:
  a second hydraulic cylinder having a second cylinder body and a second piston slidably received in the second cylinder body,
  the second piston and the second cylinder body defining a third variable volume chamber on a first side of the second piston and a fourth variable volume chamber on a second side of the second piston, the second side being opposite the first side,
  the third variable volume chamber being selectively hydraulically connected to the first variable volume chamber and hydraulically connected to the seawater inlet port, and
  the fourth variable volume chamber being hydraulically connected to the brine exhaust port,
  during the first stroke, seawater being supplied from the first variable volume chamber to the third variable volume chamber, and during the second stroke, seawater being supplied from the third variable volume chamber to the RO cell via the seawater inlet port.

12. The wave-actuated system of claim 11, wherein the RO desalination subsystem further comprises a pressure smoothing device (PSD) hydraulically connected between the brine exhaust port and the fourth variable volume chamber; and
 wherein the PSD accumulates brine during the first stroke and supplies brine to the fourth chamber during the second stroke.

13. The wave-actuated system of claim 1, further comprising a pre-filter subsystem, the pre-filter subsystem comprising at least one pre-filter hydraulically connected between the seawater intake and the first variable volume chamber.

14. The wave-actuated system of claim 13, further comprising a one-way valve hydraulically connected between the seawater intake and the first variable volume chamber;
 wherein:
  the one-way valve prevents flow of seawater from the seawater intake to the first variable chamber via the at least one pre-filter during the first stroke; and
  the one-way valve permits flow of seawater from the seawater intake to the first variable chamber via the at least one pre-filter during the second stroke.

15. The wave-actuated system of claim 13, wherein:
 the hydraulic cylinder is a first hydraulic cylinder;
 the cylinder body is a first cylinder body;
 the piston is a first piston; and
 the pre-filter subsystem further comprises:
  a second hydraulic cylinder having a second cylinder body and a second piston slidably received in the second cylinder body,
  one of the second cylinder body and the second piston being connected to the float,
  another one of the second cylinder body and the second piston being connected to the reaction member,
  the second piston and the second cylinder body defining a third variable volume chamber,
  the third variable volume chamber being selectively hydraulically connected to seawater inlet, and
  the third variable volume chamber being hydraulically connected to the at least one pre-filter to supply seawater to the at least one pre-filter during one of the first and second strokes.

16. The wave-actuated system of claim 13, wherein:
 the pre-filter subsystem further comprises a valve selectively hydraulically communicating the at least one pre-filter with one of the second variable volume chamber, the permeate exhaust port and an accumulator; and
 when the valve opens, water flows from the one of the second variable volume chamber, the permeate exhaust port and the accumulator through the at least one pre-filter to backwash the at least one pre-filter.

17. The wave actuated system of claim 13, wherein the pre-filter subsystem further comprises an accumulator hydraulically connected between the at least one pre-filter and the first variable volume chamber.

18. The wave actuated system of claim 1, further comprising an accumulator selectively hydraulically connected to the first variable volume chamber; and
 wherein the accumulator supplies water to the first variable volume chamber during the second stroke.

19. The wave-actuated system of claim 1, wherein:
 the cylinder body of the hydraulic cylinder of the WEC subsystem is connected to the float;

the piston of the hydraulic cylinder of the WEC subsystem is connected to the reaction member;
the first variable volume chamber is a lower chamber;
the second variable volume chamber is an upper chamber;
the first stroke is an upward stroke;
the first direction is an upward direction;
the second stroke is a downward stroke; and
the second direction is a downward direction.

20. A method for desalinating water by reverse osmosis using a wave-actuated system, the wave actuated system comprising a wave energy converter (WEC) subsystem and a reverse osmosis (RO) subsystem, the method comprising:
during a first stroke of the WEC subsystem:
supplying seawater from a first variable volume chamber of a hydraulic cylinder of the WEC subsystem to an RO cell of the RO subsystem via a seawater inlet port of the RO cell, the RO cell having a RO membrane contained therein;
supplying seawater from the first variable volume chamber to a flow smoothing device (FSD) of the RO subsystem;
supplying brine from a brine exhaust port of the RO cell; and
supplying permeate from a permeate exhaust port of the RO cell; and
during a second stroke of the WEC subsystem:
supplying seawater from a seawater intake to the first variable volume chamber;
supplying seawater from the FSD to the RO cell via the seawater inlet port;
supplying brine from the brine exhaust port; and
supplying permeate from the permeate exhaust port.

21. The method of claim 20, wherein, during the first stroke, supplying brine from the brine exhaust port comprises supplying brine from the brine exhaust port to a second variable volume chamber of the hydraulic cylinder; and
the method further comprises supplying brine from the second variable volume chamber to a brine discharge during the second stroke.

* * * * *